US012731542B2

(12) United States Patent
Zhang

(10) Patent No.: US 12,731,542 B2
(45) Date of Patent: Sep. 8, 2026

(54) DISPLAY PANEL, METHOD FOR DRIVING THE SAME, DISPLAY APPARATUS

(71) Applicants: Wuhan Tianma Microelectronics Co., Ltd. Shanghai Branch, Shanghai (CN); Wuhan Tianma Microelectronics Co., Ltd., Wuhan (CN)

(72) Inventor: Mengmeng Zhang, Shanghai (CN)

(73) Assignees: WUHAN TIANMA MICROELECTRONICS CO., LTD. SHANGHAI BRANCH, Shanghai (CN); WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/968,354

(22) Filed: Dec. 4, 2024

(65) Prior Publication Data

US 2025/0095584 A1 Mar. 20, 2025

(30) Foreign Application Priority Data

Jul. 10, 2024 (CN) ........................ 202410926051.0

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861;
(Continued)

(56) References Cited

U.S. PATENT DOCUMENTS

2013/0201090 A1* 8/2013 Ohara .................. G09G 3/2092 345/87
2018/0130420 A1* 5/2018 Gao ..................... G09G 3/3258
(Continued)

FOREIGN PATENT DOCUMENTS

CN 103714781 A 4/2014
CN 113707090 A 11/2021
CN 115862548 A * 3/2023 ........... G09G 3/3233

OTHER PUBLICATIONS

The State Intellectual Property Office of People's Republic of China First Office Action for corresponding Application No. 202410926051.0, 15 pages.

*Primary Examiner* — Premal R Patel
(74) *Attorney, Agent, or Firm* — Tarolli, Sundheim, Covell & Tummino LLP

(57) ABSTRACT

Display panel, method for driving the same and display apparatus are provided. The display panel includes pixel circuits that includes a driving module; a gate reset module electrically connected to a first scan line, a first reset line, and a control terminal of the driving module; a threshold compensation module electrically connected to a second scan line, a second terminal of the driving module, and the control terminal of the driving module; and a data writing module electrically connected to a third scan line, a data line and a first terminal of the driving module. Within one frame, at least a part of the third valid level is located between the first valid level and the second valid level, at least a part of the second valid level is located between the third valid level and the fourth valid level, and the fifth valid level overlaps the fourth valid level.

18 Claims, 37 Drawing Sheets

(52) U.S. Cl.
CPC ............... *G09G 2300/0861* (2013.01); *G09G 2310/0286* (2013.01); *G09G 2310/08* (2013.01); *G09G 2320/0257* (2013.01)

(58) Field of Classification Search
CPC ....... G09G 2310/0286; G09G 2310/08; G09G 2320/0257; G09G 3/3266; G09G 3/3208; G09G 3/3291
See application file for complete search history.

(56) References Cited

U.S. PATENT DOCUMENTS

2021/0407397 A1* 12/2021 Zhang ...................... G09G 3/20
2024/0221644 A1* 7/2024 Li ........................ G09G 3/3233

* cited by examiner

DISPLAY PANEL, METHOD FOR DRIVING THE SAME, DISPLAY APPARATUS

CROSS-REFERENCE TO RELATED APPLICATIONS

The present disclosure claims priority to Chinese Application No. 202410926051.0 with the application title of "DISPLAY PANEL, METHOD FOR DRIVING THE SAME, AND DISPLAY APPARATUS", filed on Jul. 10, 2024, the content of which is incorporated herein by reference in its entirety.

TECHNICAL FIELD

The present disclosure relates to the field of display technologies, and particularly relates to a display panel, a method for driving the display panel, and a display apparatus.

BACKGROUND

A display panel includes pixel circuits and light-emitting elements. The pixel circuit is configured to provide a driving current to the light-emitting element, to drive the light-emitting element to emit light. The pixel circuit typically includes a driving transistor and multiple switching transistors. The device performances of the driving transistor greatly affect the performance of the pixel circuit, which in turn affects the light-emitting effect of the light-emitting element. Therefore, optimizing the device performances of the driving transistor has become an urgent technical problem.

SUMMARY

In a first aspect, embodiments of the present disclosure provide a display panel. The display panel includes pixel circuits. One of the pixel circuits includes: a driving module, a gate reset module, a threshold compensation module, and a data writing module. The driving module includes a control terminal electrically connected to a first node, a first terminal electrically connected to a second node, and a second terminal electrically connected to a third node. The gate reset module includes a control terminal electrically connected to a first scan line, a first terminal electrically connected to a first reset line, and a second terminal electrically connected to the first node. The threshold compensation module includes a control terminal electrically connected to a second scan line, a first terminal electrically connected to the third node, and a second terminal electrically connected to the first node. The data writing module includes a control terminal electrically connected to a third scan line, a first terminal electrically connected to a data line, and a second terminal electrically connected to the second node. For the first scan line, the second scan line and the third scan line that are electrically connected to a same pixel circuit, within one frame, the first scan line outputs a first valid level and a second valid level, the second scan line outputs a third valid level and a fourth valid level, the third scan line outputs a fifth valid level, and at least a part of the third valid level is located between the first valid level and the second valid level, at least a part of the second valid level is located between the third valid level and the fourth valid level, and the fifth valid level overlaps the fourth valid level.

In a second aspect, embodiments of the present disclosure provide a method for driving a display panel. The display panel includes pixel circuits. One of the pixel circuits includes: a driving module, a gate reset module, a threshold compensation module, and a data writing module. The driving module includes a control terminal electrically connected to a first node, a first terminal electrically connected to a second node, and a second terminal electrically connected to a third node. The gate reset module includes a control terminal electrically connected to a first scan line, a first terminal electrically connected to a first reset line, and a second terminal electrically connected to the first node. The threshold compensation module includes a control terminal electrically connected to a second scan line, a first terminal electrically connected to the third node, and a second terminal electrically connected to the first node. The data writing module includes a control terminal electrically connected to a third scan line, a first terminal electrically connected to a data line, and a second terminal electrically connected to the second node. For the first scan line, the second scan line and the third scan line that are electrically connected to a same pixel circuit, within one frame, the first scan line outputs a first valid level and a second valid level, the second scan line outputs a third valid level and a fourth valid level, the third scan line outputs a fifth valid level, and at least a part of the third valid level is located between the first valid level and the second valid level, at least a part of the second valid level is located between the third valid level and the fourth valid level, and the fifth valid level overlaps the fourth valid level. A driving cycle of the pixel circuit comprises a first period, a second period, a third period, and a fourth period. The method includes: during the first period, turning on the gate reset module in response to the first valid level, and writing a first reset voltage provided by the first reset line into the first node; during the second period, turning on the threshold compensation module in response to the third valid level; during the third period, turning on the gate reset module in response to the second valid level, and writing the first reset voltage provided by the first reset line into the first node; and during the fourth period, turning on the data writing module in response to the fifth valid level, turning on the threshold compensation module in response to the fourth valid level, and writing a data voltage on the data line into the first node for threshold compensation.

In a third aspect, embodiments of the present disclosure provide a display apparatus. The display apparatus includes a display panel. The display panel includes pixel circuits. One of the pixel circuits includes: a driving module, a gate reset module, a threshold compensation module, and a data writing module. The driving module includes a control terminal electrically connected to a first node, a first terminal electrically connected to a second node, and a second terminal electrically connected to a third node. The gate reset module includes a control terminal electrically connected to a first scan line, a first terminal electrically connected to a first reset line, and a second terminal electrically connected to the first node. The threshold compensation module includes a control terminal electrically connected to a second scan line, a first terminal electrically connected to the third node, and a second terminal electrically connected to the first node. The data writing module includes a control terminal electrically connected to a third scan line, a first terminal electrically connected to a data line, and a second terminal electrically connected to the second node. For the first scan line, the second scan line and the third scan line that are electrically connected to a same pixel circuit, within one frame, the first scan line outputs a first valid level and a second valid level, the second scan line outputs a third valid level and a fourth valid level, the third scan line outputs a fifth valid level, and at least a part of the third valid level is located between the first valid level and the second valid level, at least a part of the second valid level is located between the third valid level and the fourth valid level, and the fifth valid level overlaps the fourth valid level.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms “a”, “an”, “the” and “said” in a singular form in the embodiment of the present disclosure and the attached claims are also intended to include plural forms thereof, unless noted otherwise.

It should be understood that although the terms ‘first’ and ‘second’ can be used in the present disclosure to describe scan lines, these scan lines should not be limited to these terms. These terms are used only to distinguish the scan lines from each other. For example, without departing from the scope of the embodiments of the present disclosure, a first scan line can also be referred to as a second scan line. Similarly, the second scan line can also be referred to as the first scan line.

It should be understood that the term “and/or” used in the context of the present disclosure is to describe a correlation relation of related objects, indicating that there can be three relations, e.g., A and/or B can indicate only A, both A and B, and only B. In addition, the symbol “/” in the context generally indicates that the relation between the objects in front and at the back of “/” is an “or” relationship.

The present disclosure provides a display panel, such as an organic light-emitting diode (OLED) display panel.

Figure 1:
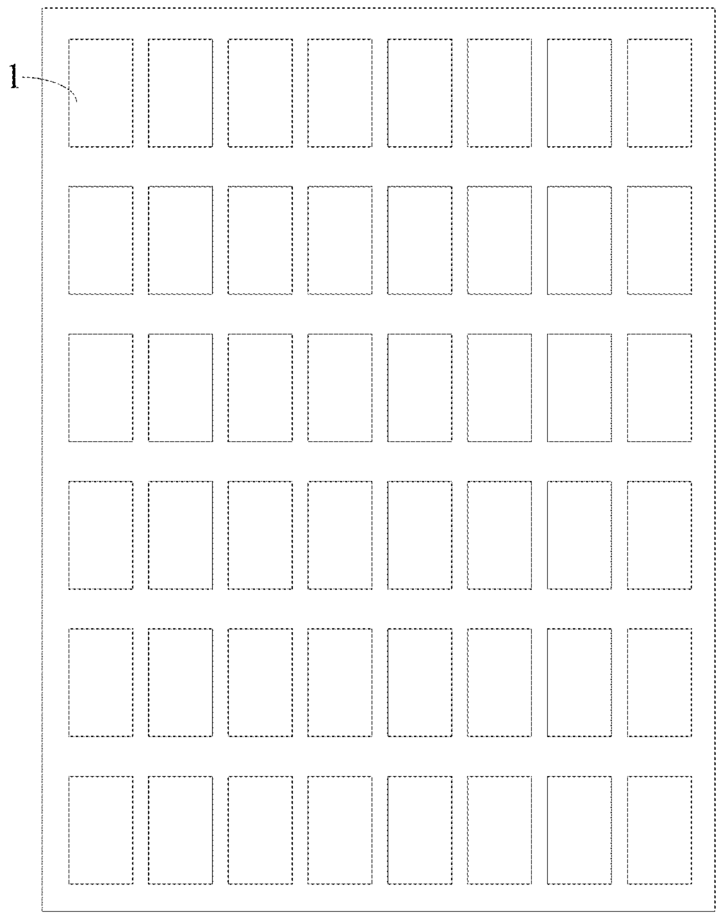
FIG. 1 is a structural schematic diagram of a display panel according to some embodiments of the present disclosure.

As shown in FIG. 1, which illustrates a structural diagram of a display panel according to some embodiments of the present disclosure, the display panel includes pixel circuits 1.

Figure 2:
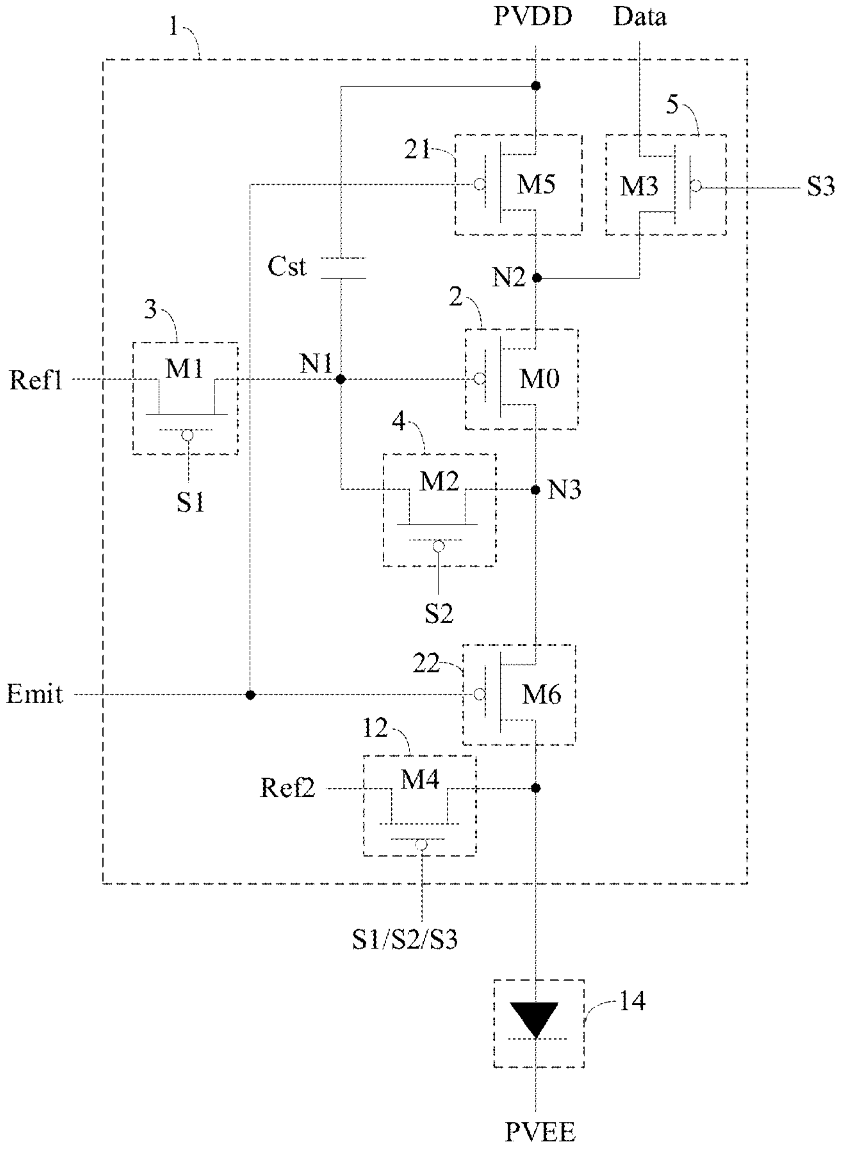
FIG. 2 is a structural schematic diagram of a pixel circuit according to some embodiments of the present disclosure.
Figure 3:
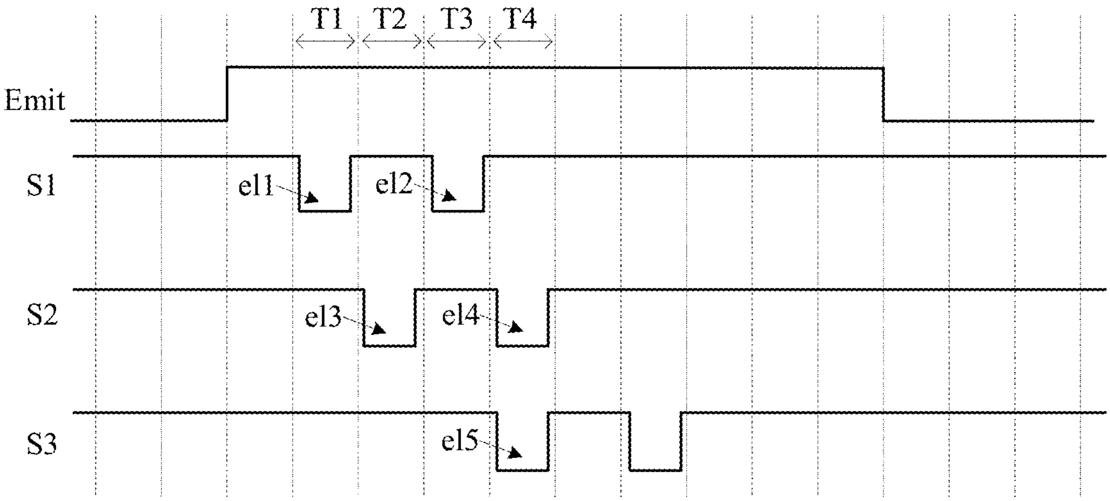
FIG. 3 is a timing diagram corresponding to FIG. 2 according to some embodiments of the present disclosure.

FIG. 2 and FIG. 3 show a structural diagram of the pixel circuit 1 and a corresponding timing diagram, respectively, according to some embodiments of the present disclosure. The pixel circuit 1 includes a driving module 2, a gate reset module 3, a threshold compensation module 4 and a data writing module 5.

In some embodiments of the present disclosure, a control terminal of the driving module 2 is electrically connected to a first node N1, a first terminal of the driving module 2 is electrically connected to a second node N2, and a second terminal of the driving module 2 is electrically connected to a third node N3. A control terminal of the gate reset module 3 is electrically connected to a first scan line S1, a first terminal of the gate reset module 3 is electrically connected to a first reset line Ref1, and a second terminal of the gate reset module 3 is electrically connected to the first node N1. A control terminal of the threshold compensation module 4 is electrically connected to a second scan line S2, a first terminal of the threshold compensation module 4 is electrically connected to the third node N3, and a second terminal of the threshold compensation module 4 is electrically connected to the first node N1. A control terminal of the data writing module 5 is electrically connected to a third scan line S3, a first terminal is of the data writing module 5 electrically connected to a data line Data, and a second terminal of the data writing module 5 is electrically connected to the second node N2.

Regarding the first scan line S1, second scan line S2 and third scan line S3 that are electrically connected to the same pixel circuit 1: within one frame, the first scan line S1 outputs a first valid level el1 and a second valid level el2, the second scan line S2 outputs a third valid level el3 and a fourth valid level el4, and the third scan line S3 outputs a fifth valid level el5. At least a part of the third valid level el3 is located between the first valid level el1 and the second valid level el2, at least a part of the second valid level el2 is located between the third valid level el3 and the fourth valid level el4, and the fifth valid level el5 overlaps the fourth valid level el4.

Corresponding to the above structure, a driving cycle of the pixel circuit 1 includes a first period T1, a second period T2, a third period T3 and a fourth period T4.

During the first period T1, the gate reset module 3 is turned on in response to the first valid level el1, the first reset voltage provided by the first reset line Ref1 is written into the first node N1.

During the second period T2, the threshold compensation module 4 is turned on in response to the third valid level el3.

During the third period T3, the gate reset module 3 is turned on again in response to the second valid level el2, the first reset voltage provided by the first reset line Ref1 is written into the first node N1 again.

During the fourth period T4, the data writing module 5 is turned on in response to the fifth valid level el5, and the threshold compensation module 4 is turned on in response to the fourth valid level el4, the data voltage provided by the data line Data is written into the first node N1 and the threshold compensation is performed on the driving module 2.

Within one frame, different sub-pixels can display different grayscale, meaning that different pixel circuits can write different data voltages. Consequently, after one frame ends, there can be inconsistent in the residual potentials at various terminals of the driving module 2 in different pixel circuits 1.

In related art, within one frame, the control terminal of the driving module is reset only once prior to charging. However, the driving modules in different pixel circuits can still exhibit inconsistent transistor device performances due to the different residual potentials at their first and second terminals, thereby affecting subsequent charging.

The technical solutions provided by the embodiments of the present disclosure effectively address the above issue. In the technical solutions provided, a three-terminal reset operation is performed on the driving module 2 in advance before the pixel circuit 1 is charged: during the first period T1, the first scan line S1 provides the first valid level el1, which can control the gate reset module 3 to be turned on and then the first reset voltage is written into the first node N1, enabling the driving module 2 to be turned on. Then, during the second period T2, the second scan line S2 provides the third valid level el3, which can control the threshold compensation module 4 to be turned on and then a conductive signal path between the first node N1, the third node N3 and the second node N2 is formed. For example, this allows the voltage on the first node N1 to be further written into the third node N3 and the second node N2, or the voltage on the second node N2 to be further written into the third node N3 and the first node N1. Illustratively, during this period, the first reset voltage on the first node N1 can be transmitted to the third node N3 via the conductive threshold compensation module 4, and then to the second node N2 via the conductive driving module 2, achieving a three-terminal reset of the driving module 2. In this way, prior to charging, the device performances of the driving module 2 in different pixel circuits 1 can be set to the same initial state, effectively resolving the issue of inconsistent device performances of the driving module 2 caused by different grayscale displayed by different sub-pixels in the previous frame.

Furthermore, in some embodiments of the present disclosure, after the three-terminal reset of the driving module 2 is completed and prior to entering the charging period, the first scan line S1 can provide the second valid level el2 to control the gate reset module 3 to be turned on again, resetting the first node N1 once more. This can compensate for potential changes that can occur at the first node N1 during the second period T2, ensuring that the potential at the first node N1 is consistent in different pixel circuits 1 prior to charging.

In some embodiments of the present disclosure, referring to FIG. 4 to FIG. 6, FIG. 11 to FIG. 15 and FIG. 17 to FIG. 19, the display panel further includes a first shift register 9, which includes multiple first shift sub-registers 10 arranged in cascade. Within one frame, each first shift sub-register 10 outputs at least two valid levels.

For the same pixel circuit 1, at least two of first scan line S1, second scan line S2 and third scan line S3 that correspond to the same pixel circuit 1 are electrically connected to the first shift sub-registers 10. In other words, the scan signals provided by at least two of the first scan line S1, second scan line S2 and third scan line S3 are borrowed from signals of different stages within the same shift register. In this way, at most two shift registers are required to drive these three scan lines, reducing the number of shift registers in the display panel and contributing to a narrow border.

Furthermore, in some embodiments of the present disclosure, all three of the first scan line S1, second scan line S2 and third scan line S3 are electrically connected to the first shift register 9, or only two of them are electrically connected to the first shift register 9.

Figure 4:
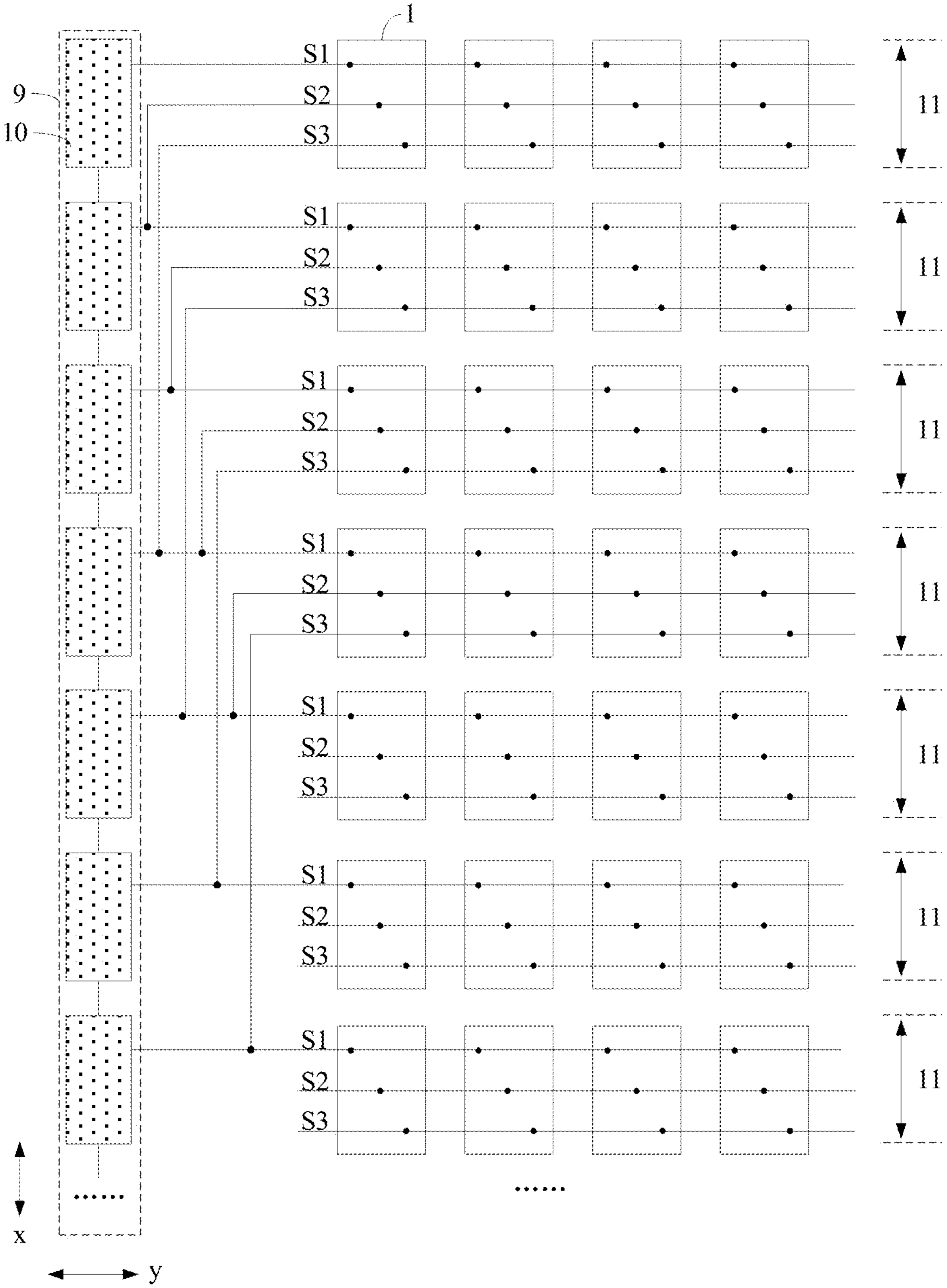
FIG. 4 is a schematic diagram of a connection between a scan line and a shift register according to some embodiments of the present disclosure.
Figure 5:
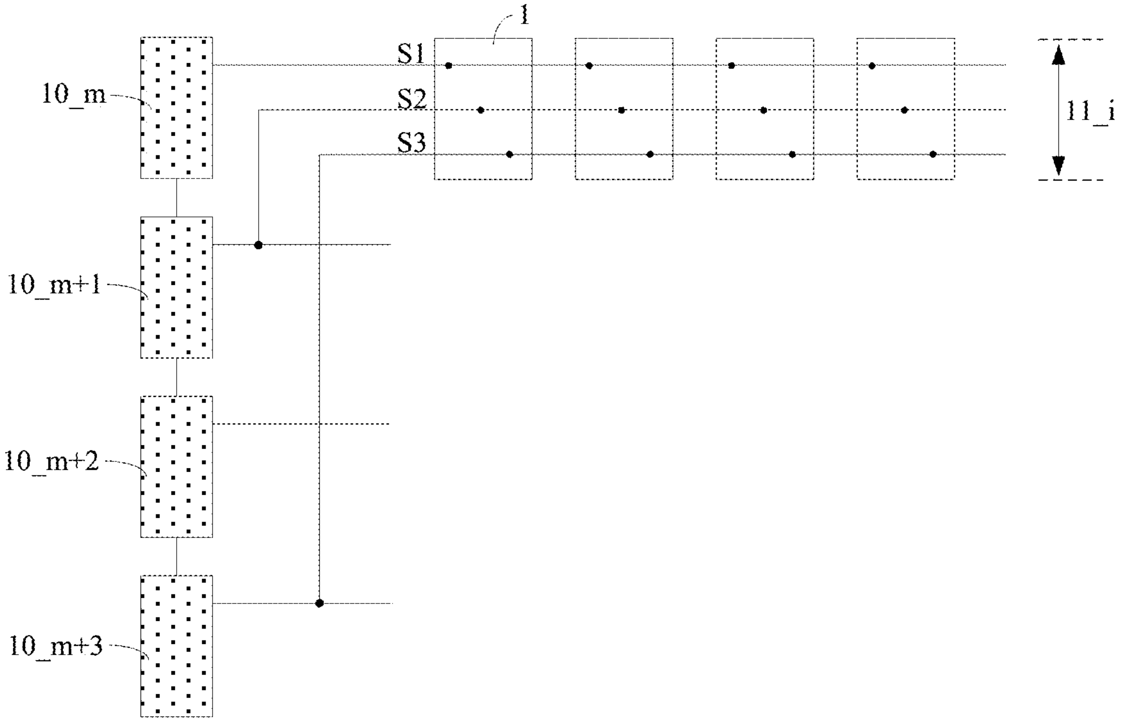
FIG. 5 is a schematic diagram of a connection between a scan line and a shift register corresponding to the i-th circuit row in FIG. 4.
Figure 6:
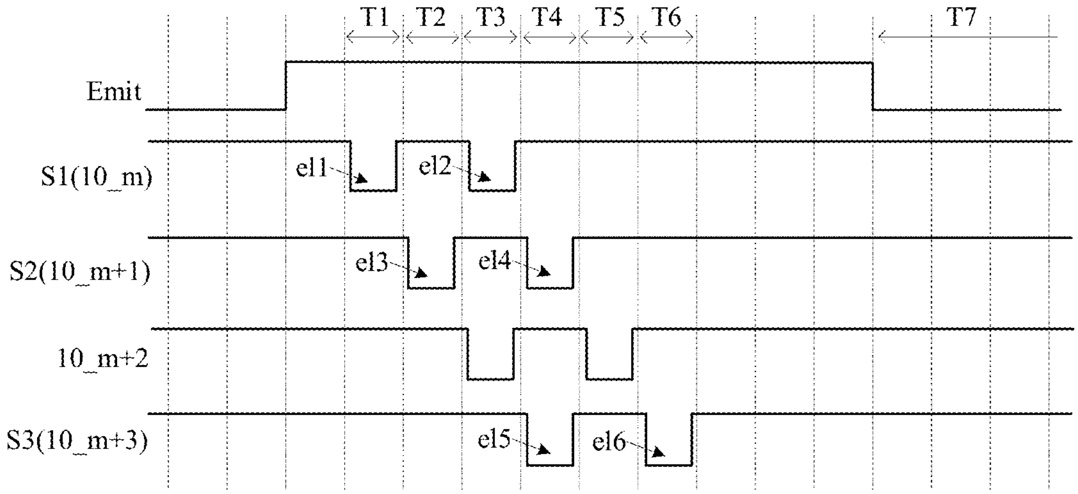
FIG. 6 is a timing diagram corresponding to FIG. 5 according to some embodiments of the present disclosure.

FIG. 4 shows a schematic diagram of a connection between scan lines and shift registers according to embodiments of the present disclosure, FIG. 5 shows a schematic diagram of a connection between shift registers and scan lines corresponding to the i-th circuit row in FIG. 4, and FIG. 6 is a timing diagram corresponding to FIG. 5. When all three of the first scan line S1, second scan line S2, and third scan line S3 are electrically connected to the first shift register 9, as shown in FIG. 2, FIG. 4 to FIG. 6, the display panel further includes multiple circuit rows 11 arranged along a first direction x, where each circuit row 11 includes multiple pixel circuits 1 arranged along a second direction y that intersects with the first direction x.

For the i-th circuit row 11_*i*, its corresponding first scan line S1, second scan line S2 and third scan line S3 are respectively electrically connected to the m-th first shift sub-register 10_*m*, the (m+1)-th first shift sub-register 10_*m*+1 and the (m+3)-th first shift sub-register 10_*m*+3 within the first shift register 9, where i is an integer greater than or equal to 1, and m is an integer greater than or equal to 1.

In some embodiments of the present disclosure, m=i. That is, the first scan line S1, second scan line S2 and third scan line S3 corresponding to the first circuit row 11_1 are respectively electrically connected to the 1st, 2nd and 4th first shift sub-registers 10; the first scan line S1, second scan line S2 and third scan line S3 corresponding to the second circuit row 11_2 are respectively electrically connected to the 2nd, 3rd and 5th first shift sub-registers 10, and so on in a similar fashion.

According to the operating performances of the shift register, when multiple shift sub-registers within the same shift register sequentially output valid levels, the valid levels output by adjacent two shift sub-registers do not overlap each other. When all three scan lines are electrically connected to the first shift register 9, the first valid level el1, second valid level el2, third valid level el3, fourth valid level el4 and fifth valid level el5 can satisfy the following conditions: the third valid level el3 is located between the first valid level el1 and the second valid level el2. A time interval between the third valid level el3 and the first valid level el1 is equal to a time interval between the third valid level el3 and the second valid level el2. The second valid level el2 is located between the third valid level el3 and the fourth valid level el4. A time interval between the second valid level el2 and the third valid level el3 is equal to a time interval between the second valid level el2 and the fourth valid level el4. The period of the fifth valid level el5 overlaps the period of the fourth valid level el4.

Further, it can be realized that: during the first period T1, the gate reset module 3 is controlled to be turned on, resetting the first node N1; during the second period T2, the threshold compensation module 4 is controlled to be turned on, performing a three-terminal reset of the driving module 2; during the third period T3, the gate reset module 3 is controlled to be turned on again, resetting the first node N1 once more; during the fourth period T4, both the data write module 5 and the threshold compensation module 4 are controlled to be turned on, charging the first node N1 and performing threshold compensation.

Furthermore, when the third scan line S3 is connected to the first shift register 9, subsequent to outputting the fifth valid level el5, the third scan line S3 will further output a sixth valid level el6. In this regard, referring further to FIG. 6, the driving cycle of the pixel circuit 1 further includes a fifth period T5 and a sixth period T6. During the sixth period T6, the data write module 5 is turned on in response to the sixth valid level el6, the voltage on the data line Data is written into the second node N2, thereby refreshing the potential of the second node N2 subsequent to charging, adjusting the bias state of the driving transistor M0, preventing the performances of the driving transistor M0 from drifting, improving the hysteresis effect of the driving transistor M0, and weakening residual images.

In the above structure, the signals required by the first scan line S1, second scan line S2 and third scan line S3 are provided by the same set of shift registers, significantly reducing the number of shift registers required in the display panel. This technical solution is more suitable for the design of display panels with extremely narrow borders.

Figure 7:
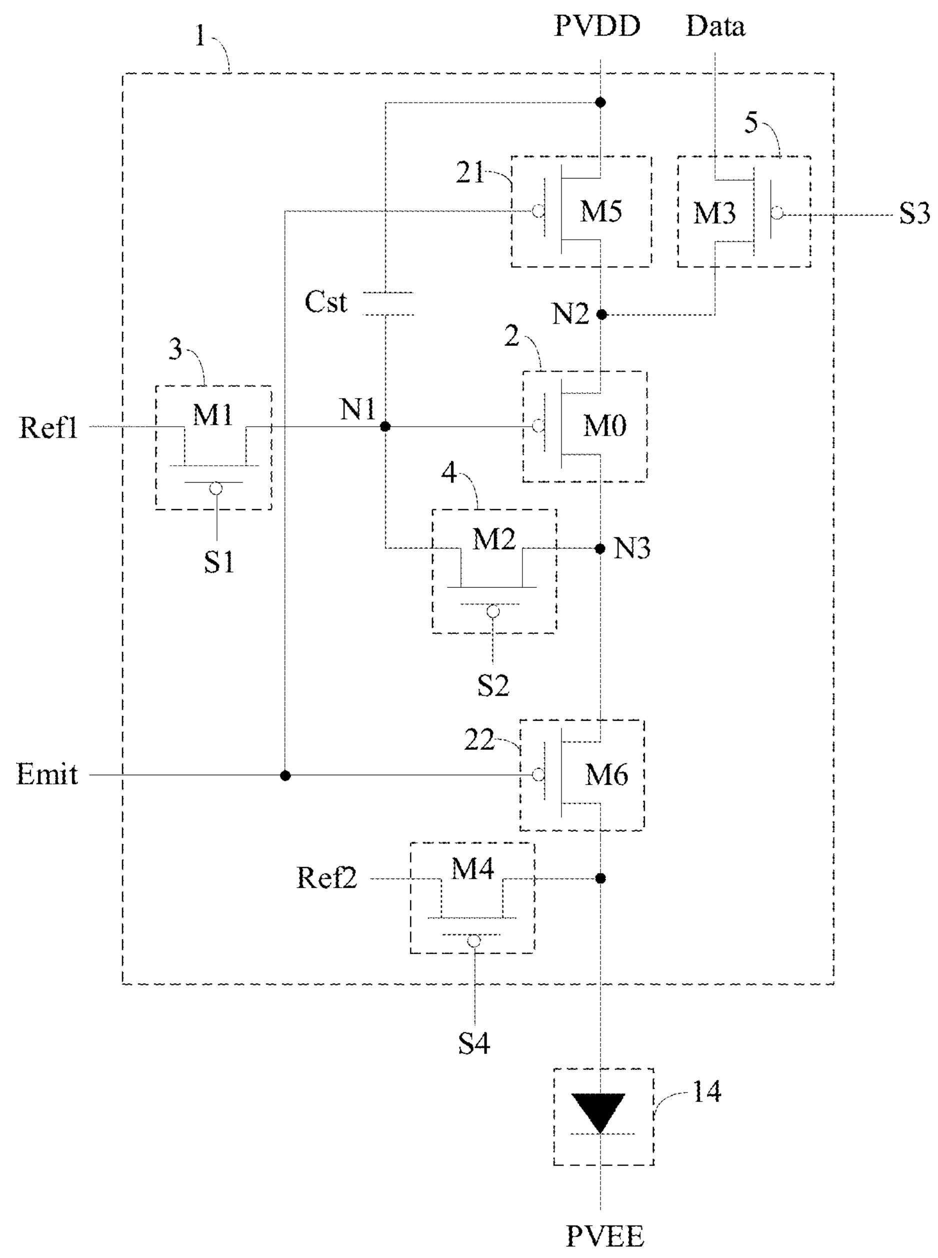
FIG. 7 is a structural schematic diagram of a pixel circuit according to some embodiments of the present disclosure.
Figure 8:
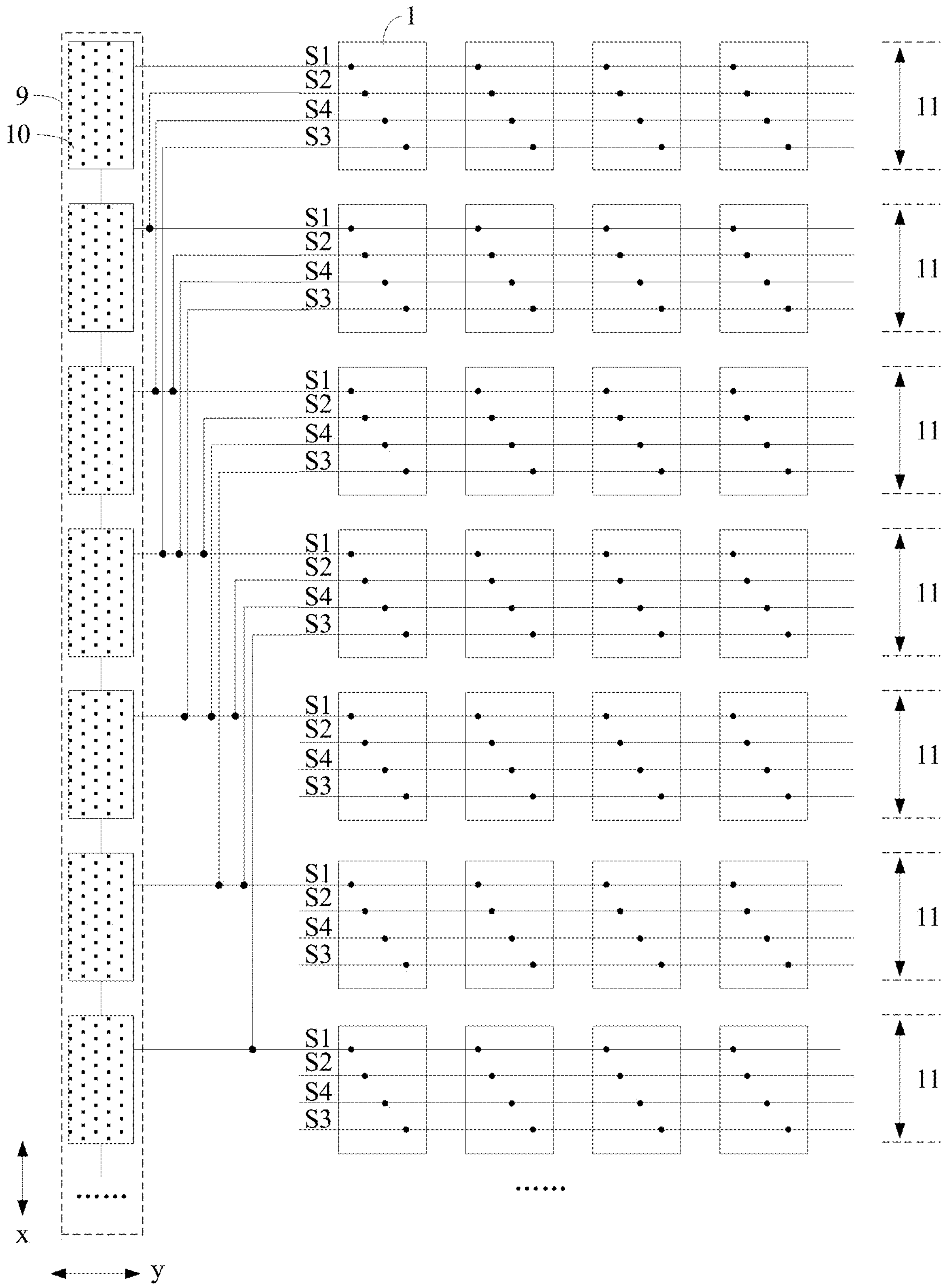
FIG. 8 is a schematic diagram of a connection between a scan line and a shift register according to some embodiments of the present disclosure.
Figure 9:
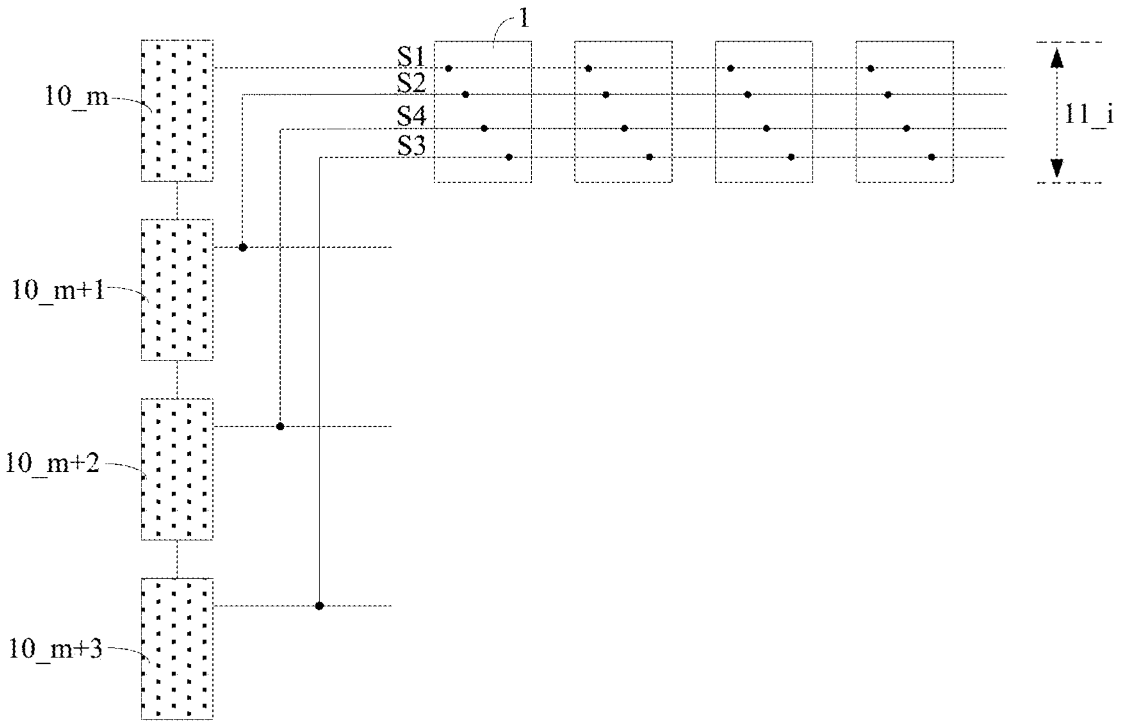
FIG. 9 is a schematic diagram of a connection between a scan line and a shift register corresponding to the i-th circuit row in FIG. 8 according to some embodiments of the present disclosure.
Figure 10:
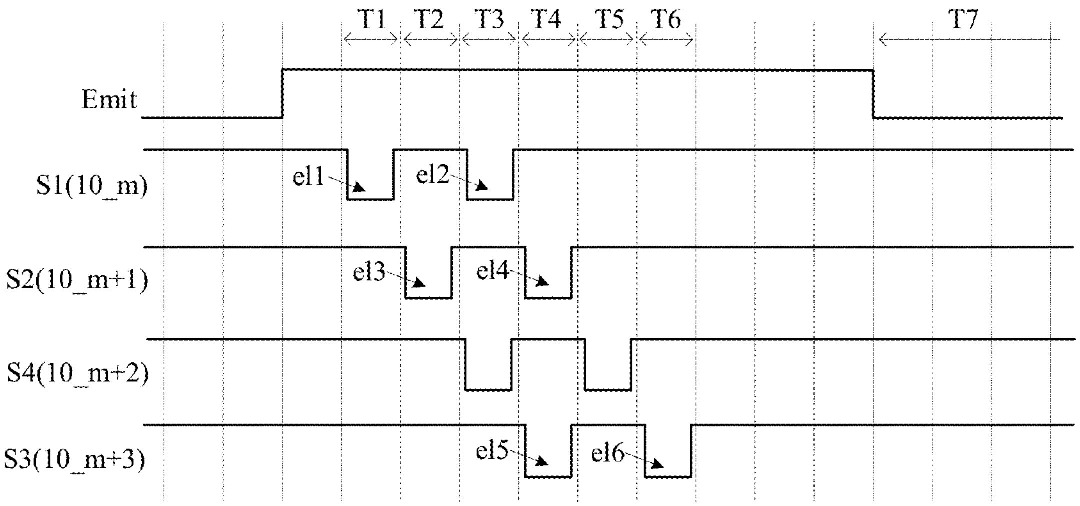
FIG. 10 is a timing diagram corresponding to FIG. 9 according to some embodiments of the present disclosure.

FIG. 7 is a structural schematic diagram of the pixel circuit 1 according to some embodiments of the present disclosure, FIG. 8 is a schematic diagram of a connection of scan lines and shift registers according to some embodiments of the present disclosure, FIG. 9 is a schematic diagram of a connection of shift registers and scan lines corresponding to the i-th circuit row in FIG. 8, and FIG. 10 is a timing diagram corresponding to FIG. 9. Furthermore, as shown in FIG. 7 to FIG. 10, the pixel circuit 1 further includes an anode reset module 12. A control terminal of the anode reset module 12 is electrically connected to a fourth scan line S4, the first terminal of the anode reset module 12 is electrically connected to a second reset line Ref2, and the second terminal of the anode reset module 12 is electrically connected to a light-emitting element 14.

For the i-th circuit row 11_*i*, its corresponding fourth scan line S4 is electrically connected to the (m+2)-th first shift sub-register 10_*m*+2 in the first shift register 9.

Based on the above structure, referring to FIG. 10, during the third period T3 and the fifth period T5, the anode reset module 12 is controlled to be turned on, the second reset voltage on the second reset line Ref2 is written into the anode of the light-emitting element 14, thereby resetting the anode of the light-emitting element 14. In this structure, the signal required by the fourth scan line S4 is further provided by the first shift register 9, so that an additional shift register is not required to dispose for the fourth scan line S4, resulting in a more optimized structural design of the display panel.

When only two of the first scan line S1, the second scan line S2 and the third scan line S3 are electrically connected to the first shift register 9, referring to FIG. 11 to FIG. 15 and FIG. 17 to FIG. 19, the display panel further includes a second shift register 15, which includes multiple second shift sub-registers 16 arranged in cascade. The first shift register 9 and the second shift register 15 can be located on opposite sides of the circuit rows 11 in the second direction y.

The first scan line S1 is electrically connected to the second shift sub-register 16, while the second scan line S2 and the third scan line S3 are electrically connected to the first shift sub-registers 10, respectively. Alternatively, the first scan line S1 and the second scan line S2 are electrically connected to the first shift sub-registers 10, respectively, while the third scan line S3 is electrically connected to the second shift sub-register 16.

When the signals provided by the first scan line S1, the second scan line S2 and the third scan line S3 originate from two shift registers, the parameters of the valid levels output by these scan lines can be controlled diversely through differential design of the types of these two shift registers, the time point of receiving the frame start signal, the pulse width and frequency of the received clock signal, etc., making the driving of the pixel circuit more flexible.

Figure 11:
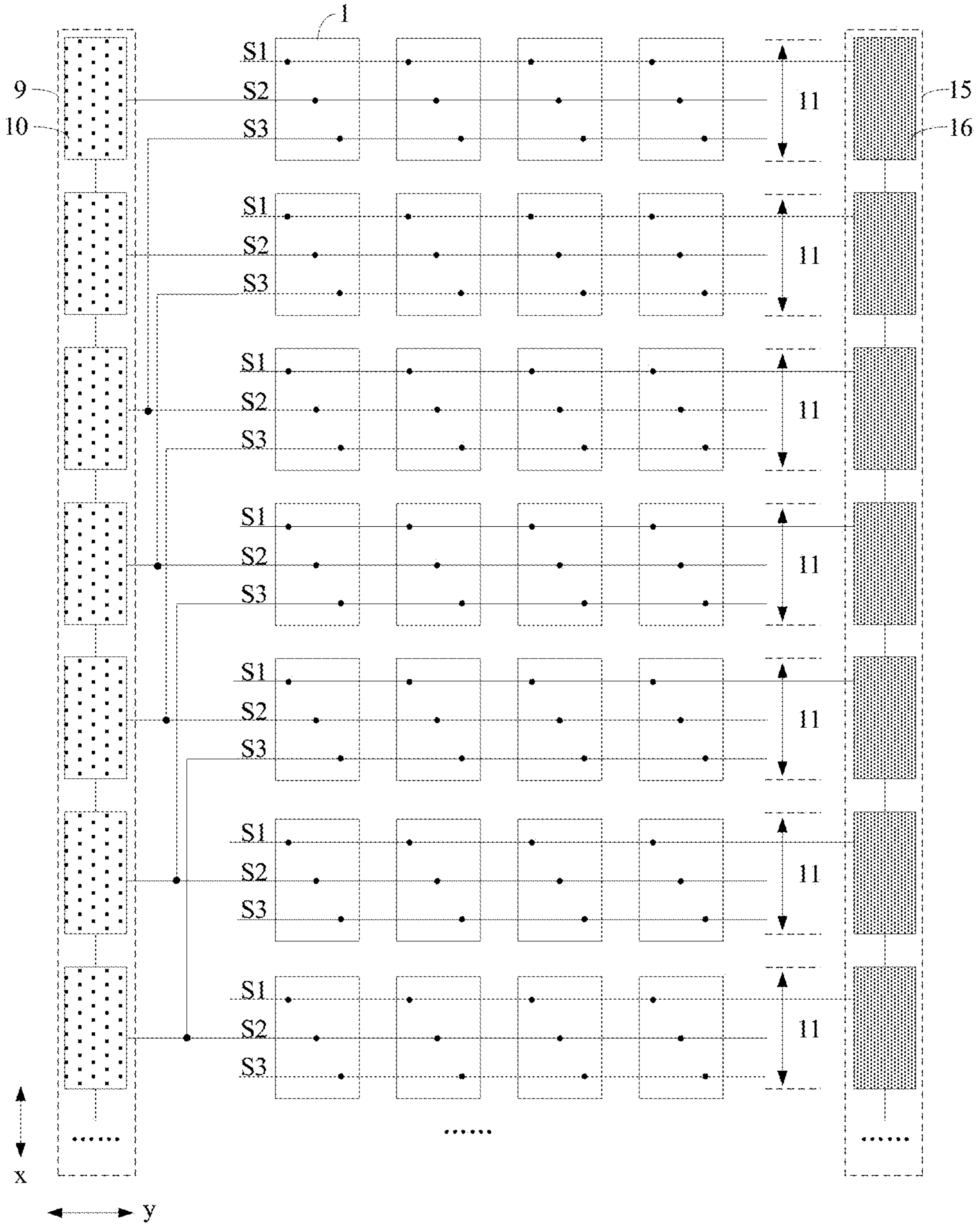
FIG. 11 is a schematic diagram of a connection between a scan line and a shift register according to some embodiments of the present disclosure.
Figure 12:
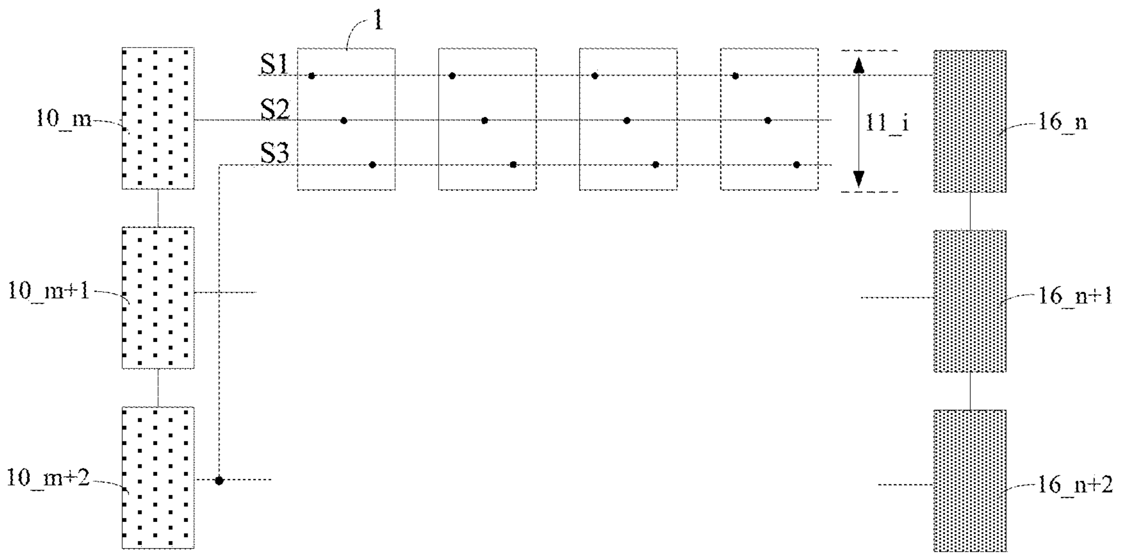
FIG. 12 is a schematic diagram of a connection between a scan line and a shift register corresponding to the i-th circuit row in FIG. 11 according to some embodiments of the present disclosure.
Figure 13:
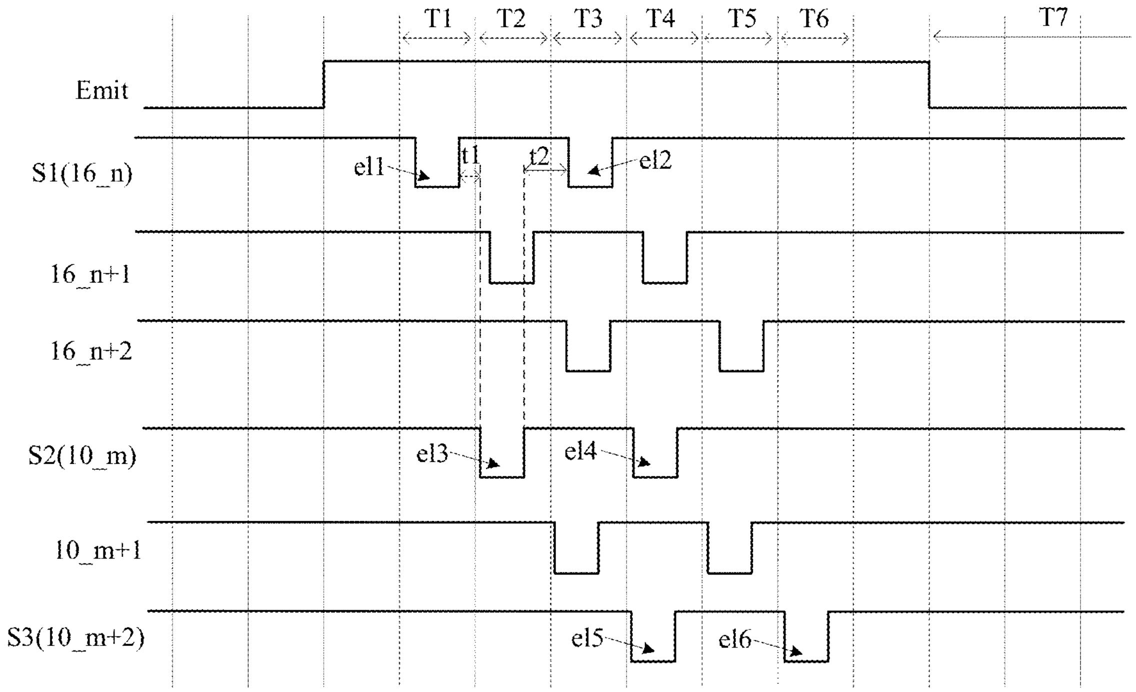
FIG. 13 is a timing diagram corresponding to FIG. 12 according to some embodiments of the present disclosure.

FIG. 11 is a schematic diagram of a connection of scan lines and shift registers according to some embodiments of the present disclosure, FIG. 12 is a schematic diagram of a connection of shift registers and scan lines corresponding to the i-th circuit row in FIG. 11, and FIG. 13 is a timing diagram corresponding to FIG. 12. When the display panel includes a second shift register 15, in some embodiments of the present disclosure, as shown in FIG. 2, FIG. 11 to FIG. 13, within one frame, the second shift sub-register 16 outputs at least two valid levels.

The display panel further includes multiple circuit rows 11 arranged along the first direction x, where each circuit row 11 includes multiple pixel circuits 1 arranged along the second direction y, and the first direction x intersects with the second direction y.

For the i-th circuit row 11_*i*, its corresponding first scan line S1 is electrically connected to the n-th second shift sub-register 16_*n* in the second shift register 15, while its corresponding second scan line S2 and third scan line S3 are electrically connected to the m-th first shift sub-register 10_*m* and the (m+2)-th first shift sub-register 10_*m*+2, respectively, in the first shift register 9. Where i, m, and n are integers greater than or equal to 1.

In some embodiments of the present disclosure, m=i and n=i. That is, for the first circuit row 11_1, its corresponding first scan line S1 is electrically connected to the 1st second shift sub-register 16_1, and its corresponding second scan line S2 and third scan line S3 are electrically connected to the 1st first shift sub-register 10_1 and the 3rd first shift sub-register 10_3, respectively; for the second circuit row 11_2, its corresponding first scan line S1 is electrically connected to the 2nd second shift sub-register 16_2, and its corresponding second scan line S2 and third scan line S3 are electrically connected to the 2nd first shift sub-register 10_2 and the 4th first shift sub-register 10_4, respectively; and so on.

Furthermore, referring to FIG. 13, the time interval between the time point when the n-th second shift sub-register 16_*n* stops outputting the first valid level el1 and the time point when the m-th first shift sub-register 10_*m* starts outputting the third valid level el3 is t1, and the time interval between the time point when the m-th first shift sub-register 10_*m* stops outputting the third valid level el3 and the time point when the n-th second shift sub-register 16_*n* starts outputting the second valid level el2 is t2, with t1+t2. Additionally, the second valid level el2 output by the n-th second shift sub-register 16_*n* does not overlap the fifth valid level el5 output by the (m+2)-th first shift sub-register 10_*m*+2.

In such configuration, the second scan line S2 and the third scan line S3 are electrically connected to the first shift register 9, while the first scan line S1 is separately connected to the second shift register 15. By adjusting the time point when the first shift register 9 receives the frame start signal, the time point when the second scan line S2 and the third scan line S3 output valid levels can be adjusted, such as shortening or lengthening the interval between the third valid level el3 output by the second scan line S2 and the first valid level el1 output by the first scan line S1, thereby achieving more flexible driving of the timing for various operations performed by the pixel circuit 1.

Moreover, the above configuration further specifies that the second valid level el2 does not overlap the fifth valid level el5. In other words, during the period when the fourth valid level el4 overlaps the fifth valid level el5, the first scan line S1 outputs a non-valid level. This avoids signal disturbance at the first node N1 due to simultaneous activation of the gate reset module 3, the data write module 5 and the threshold compensation module 4, and simultaneous writing the first reset voltage and the data voltage into the first node N1.

Furthermore, referring again to FIG. 13, t1<t2, indicating that the time point when the second scan line S2 outputs the third valid level el3 is advanced. Correspondingly, the time point when the third scan line S3 stops outputting the sixth enable level el6 is further advanced. This can reduce the overall duration required for the first scan line S1, the second scan line S2 and the third scan line S3 to output valid levels within one frame, reducing non-glowing time and increasing the proportion of glowing time.

Figure 14:
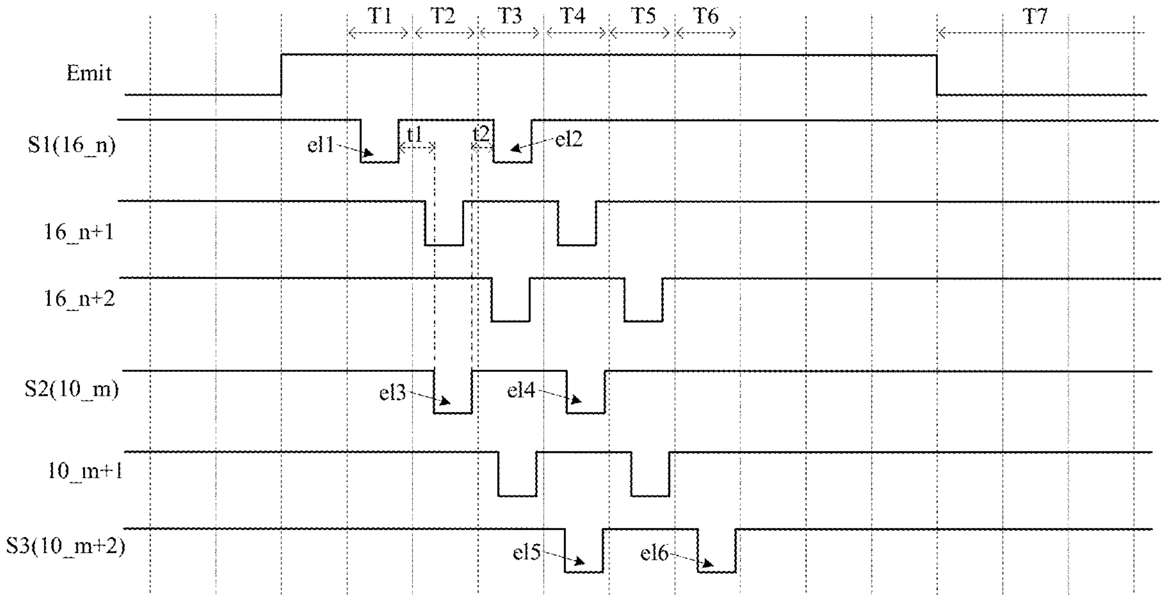
FIG. 14 is a timing diagram corresponding to FIG. 12 according to some embodiments of the present disclosure.
Figure 15:
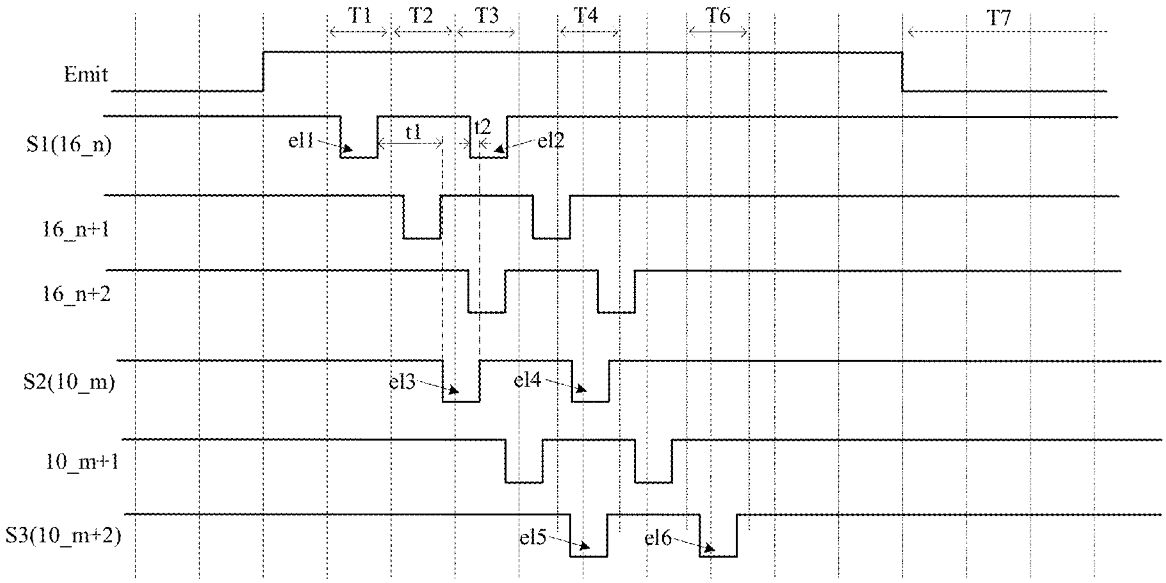
FIG. 15 is a timing diagram corresponding to FIG. 12 according to some embodiments of the present disclosure.

FIG. 14 depicts a timing diagram corresponding to FIG. 12, and FIG. 15 is a timing diagram corresponding to FIG. 12. In some embodiments of the present disclosure, as shown in FIGS. 14 and 15, t1>t2.

It should be noted that when t1>t2, under the premise that the second valid level el2 does not overlap the fifth valid level el5, referring to FIG. 15, the third valid level el3 can overlap the second valid level el2. In this case, the time point when the m-th first shift sub-register 10_*m* stops outputting the third valid level el3 is later than the time point when the n-th second shift sub-register 16_*n* starts outputting the second valid level el2.

Figure 16:
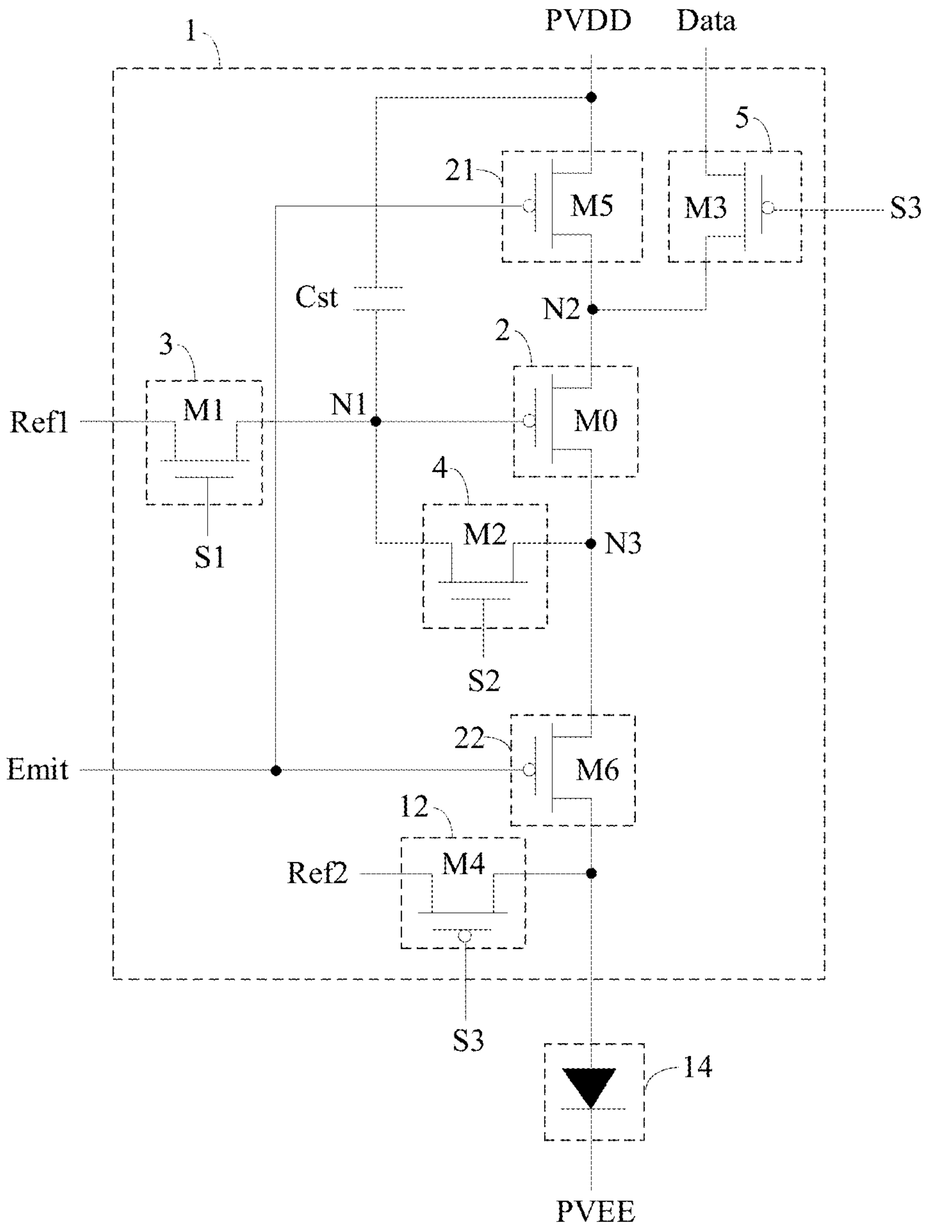
FIG. 16 is a structural schematic diagram of a pixel circuit according to some embodiments of the present disclosure.
Figure 17:
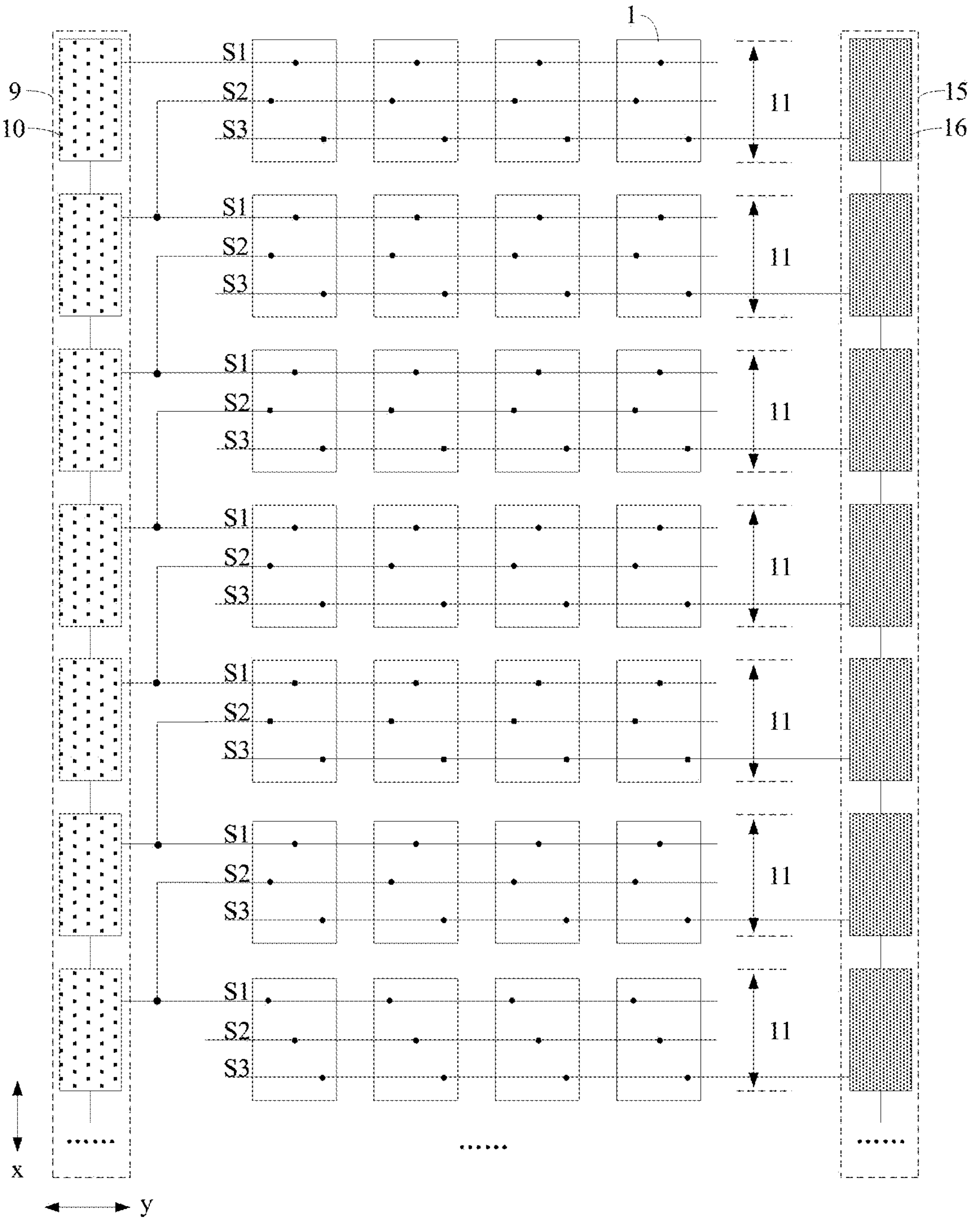
FIG. 17 is a schematic diagram of a connection between a scan line and a shift register according to some embodiments of the present disclosure.
Figure 18:
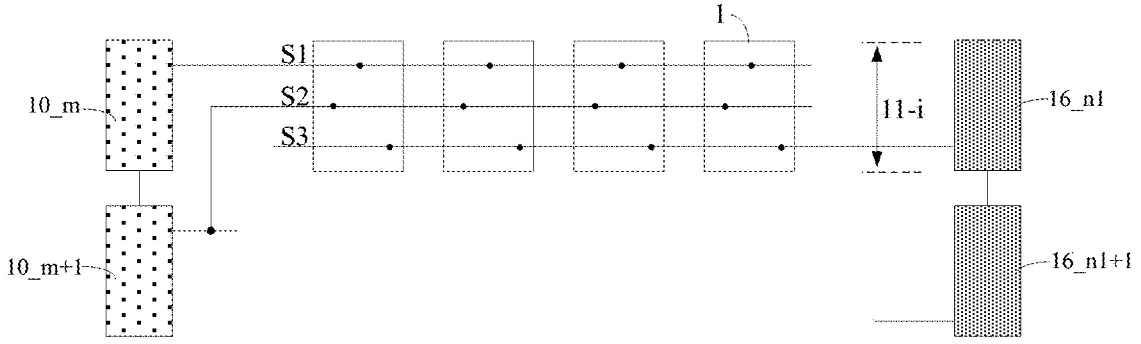
FIG. 18 is a schematic diagram of a connection between a scan line and a shift register corresponding to the i-th circuit row in FIG. 17 according to some embodiments of the present disclosure.
Figure 19:
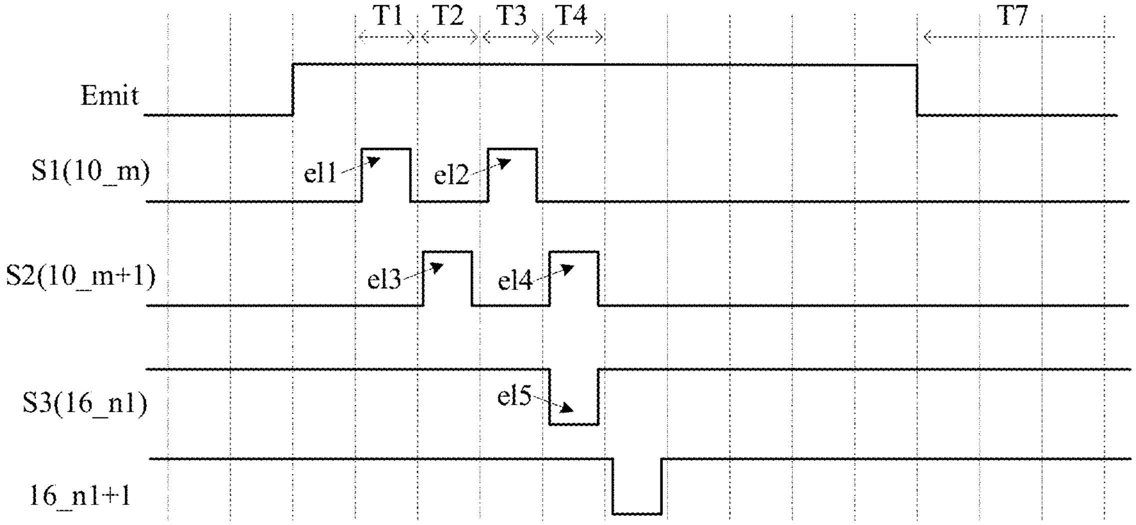
FIG. 19 is a timing diagram corresponding to FIG. 18 according to some embodiments of the present disclosure.

FIG. 16 is a schematic diagram of the structure of the pixel circuit 1 according to some embodiments of the present disclosure, FIG. 17 is a connection diagram of scan lines and shift registers provided by embodiment of the present disclosure, FIG. 18 is a connection diagram of shift registers and scan lines corresponding to the i-th circuit row in FIG. 17, and FIG. 19 is a timing diagram corresponding to FIG. 18. When the display panel includes the second shift register 15, in some embodiments of the present disclosure, as shown in FIG. 16 to FIG. 19, during one frame, the second shift sub-register 16 outputs at least one valid level, and the potential of the valid level output by the second shift sub-register 16 is opposite to that of the valid level output by the first shift sub-register 10.

The display panel further includes multiple circuit rows 11 arranged along the first direction x. Each circuit row 11 includes multiple pixel circuits 1 arranged along the second direction y which intersects with the first direction x.

For the i-th circuit row 11_*i*, its corresponding first scan line S1 and second scan line S2 are electrically connected to the m-th first shift sub-register 10_*m* and (m+1)-th first shift sub-register 10_m+1, respectively, in the first shift register 9, while its corresponding third scan line S3 is electrically connected to the n1-th second shift sub-register 16_n1 in the second shift register 15, where i, m and n1 are integers greater than or equal to 1.

The potential of the valid level output by the second shift sub-register 16 being opposite to that of the valid level output by the first shift sub-register 10 implies that the transistor type of the data write transistor M3 in the data write module 5 is opposite to the gate reset transistor M1 in the gate reset module 3 and the threshold compensation transistor M2 in the threshold compensation module 4. In embodiments of the present disclosure, the data write transistor M3 can be designed as a p-type low temperature poly-silicon (LTPS) transistor, while the gate reset transistor M1 and the threshold compensation transistor M2 can be designed as a n-type indium gallium zinc oxide (IGZO) transistors with lower leakage current. In this case, the valid level output by the second shift sub-register 16 is a low level, while the valid level output by the first shift sub-register 10 is a high level.

In such configuration, the transistors in the pixel circuit 1 do not necessarily have to be of the same type. For example, some IGZO transistors can be employed to reduce the leakage current of the driving transistor M0. Furthermore, with this structure, the third scan line S3 is solely driven by the second shift register 15, allowing for differential design in the number of valid levels output by the third scan line S3 compared to those of the first scan line S1 and the second scan line S2 within a frame. For instance, only one valid level (the fifth valid level el5) can be controlled to be output by the third scan line S3 within a frame.

Figure 20:
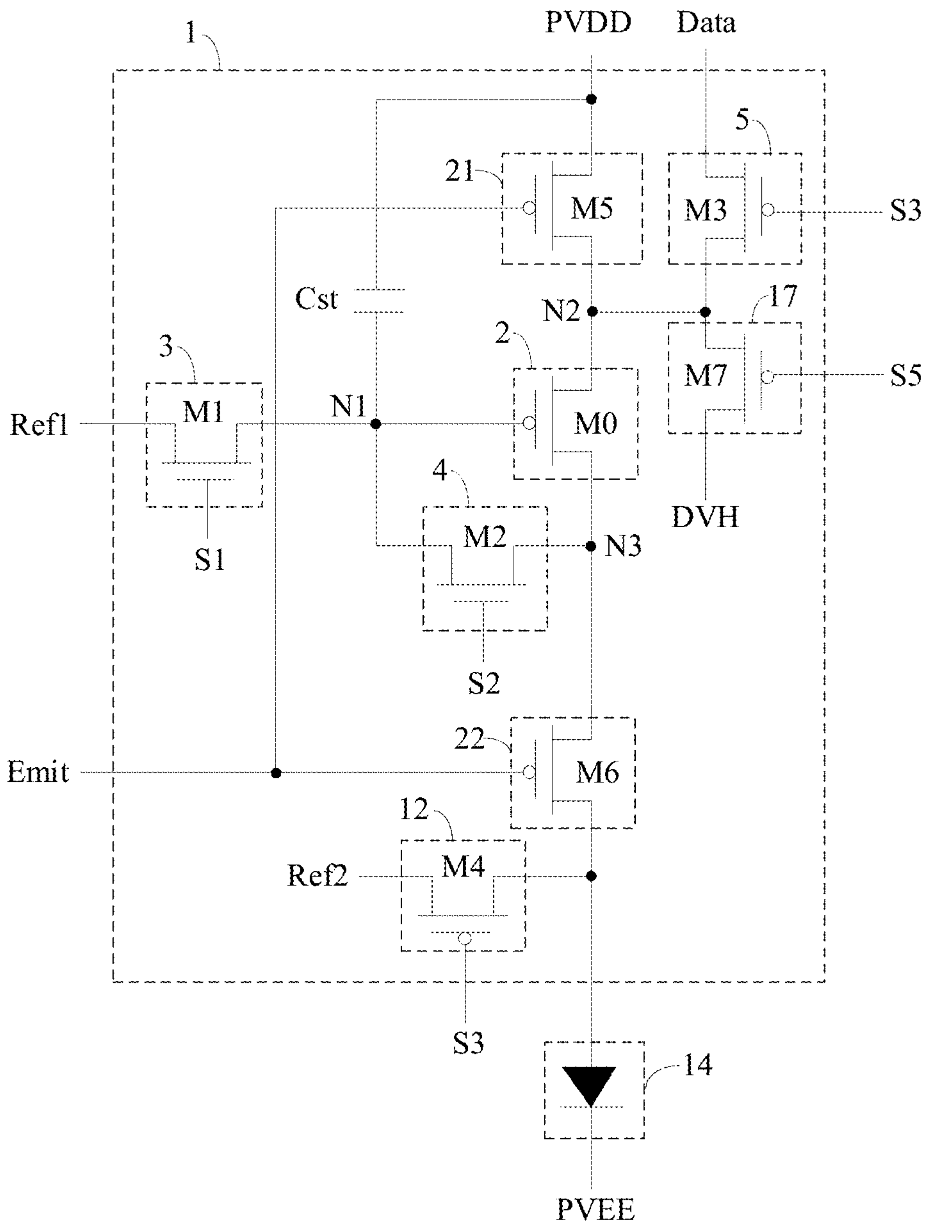
FIG. 20 is a structural schematic diagram of a pixel circuit according to some embodiments of the present disclosure.
Figure 21:
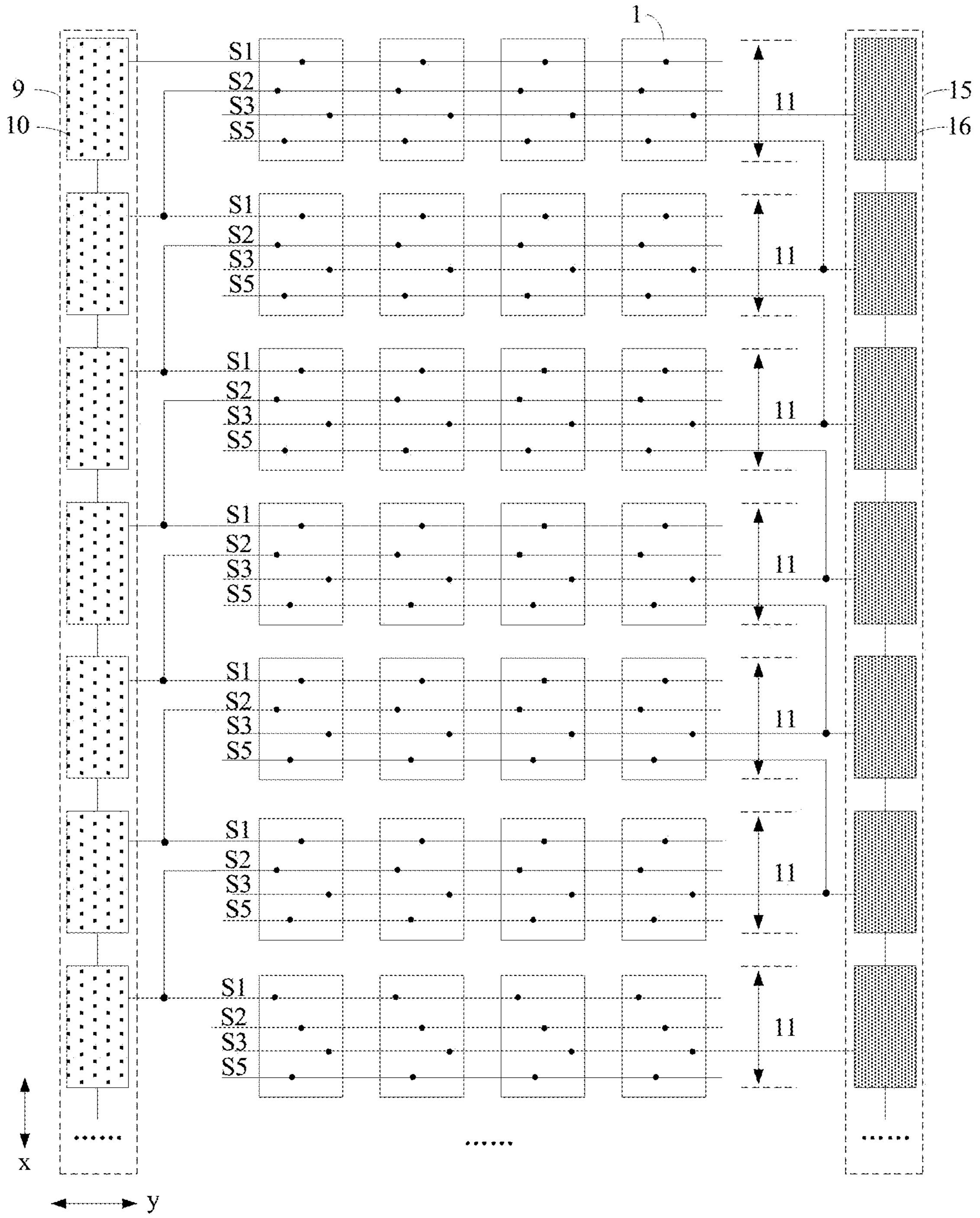
FIG. 21 is a schematic diagram of a connection between a scan line and a shift register according to some embodiments of the present disclosure.
Figure 22:
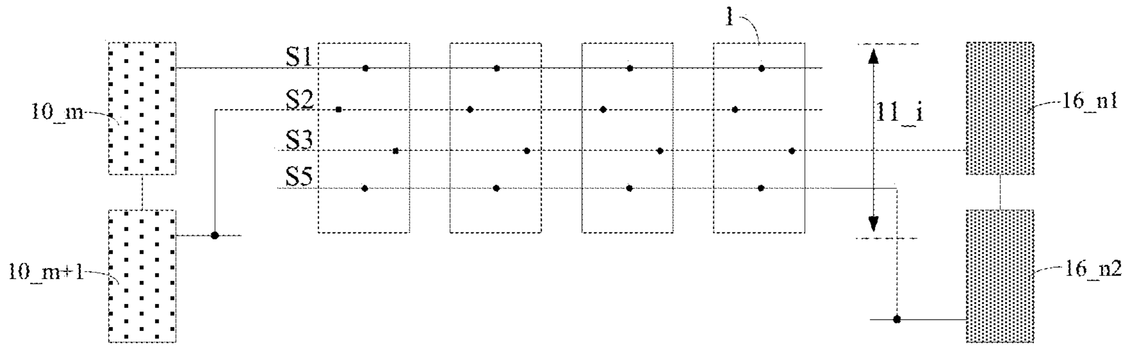
FIG. 22 is a schematic diagram of a connection between a scan line and a shift register corresponding to the i-th circuit row in FIG. 21 according to some embodiments of the present disclosure.
Figure 23:
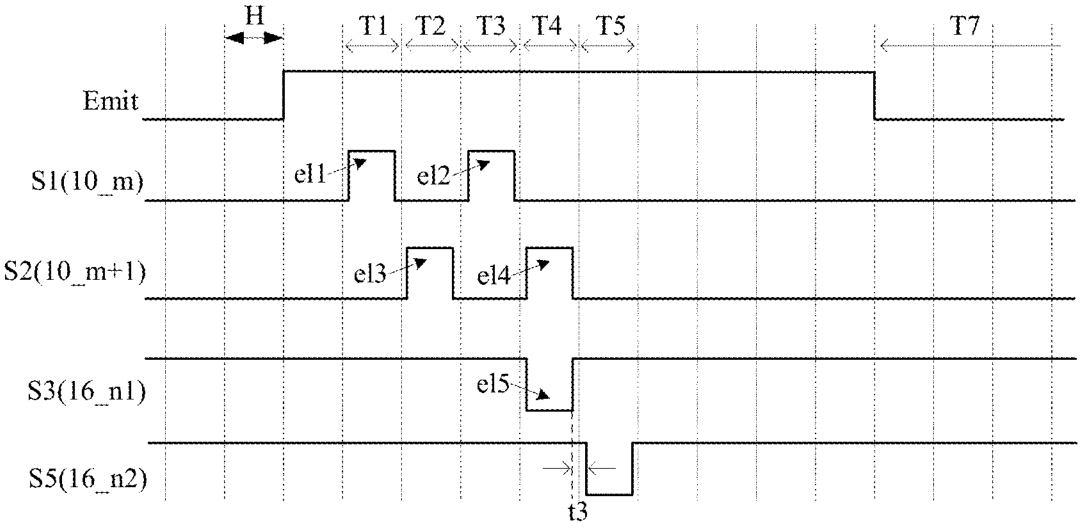
FIG. 23 is a timing diagram corresponding to FIG. 22 according to some embodiments of the present disclosure.

FIG. 20 is a schematic diagram of the structure of the pixel circuit 1 according to some embodiments of the present disclosure, FIG. 21 is a connection diagram of scan lines and shift registers according to some embodiments of the present disclosure, FIG. 22 is a connection diagram of shift registers and scan lines corresponding to the i-th circuit row in FIG. 21, and FIG. 23 is a timing diagram corresponding to FIG. 22. In some embodiments of the present disclosure, as shown in FIG. 20 to FIG. 23, the display panel further includes a bias adjustment module 17. A control terminal of the bias adjustment module 17 is electrically connected to the fifth scan line S5, the first terminal of the bias adjustment module 17 is electrically connected to the bias signal line DVH, and the second terminal of the bias adjustment module 17 is electrically connected to the second node N2.

For the i-th circuit row 11_i, its corresponding fifth scan line S5 is electrically connected to the n2-th second shift sub-register 16_n2 in the second shift register 15, n2 is an integer greater than or equal to 1, and n2≠n1.

Based on the above structure, prior to or subsequent to charging, the bias adjustment module 17 is turned on to write the bias voltage on the bias signal line DVH into the second node N2, refreshing the potential of the second node N2 and adjusting the bias state of the driving transistor M0. This prevents the performances of the driving transistor M0 from drifting and improves hysteresis effect of the driving transistor M0. Moreover, since the fifth scan line S5 and the third scan line S3 are connected to the same shift register, there is no need to dispose an additional shift register for the fifth scan line S5.

Regarding n2, in some embodiments of the present disclosure, referring again to FIG. 21 to FIG. 23, n2=n1+1. In some embodiments of the present disclosure, n1=i, and n2=i+1.

This structure adjusts the bias state of the driving transistor M0 by the bias drive module 2 subsequent to charging is completed, ensuring that the driving transistor M0 maintains optimal performances during the period from charging to light-emitting.

Furthermore, when n2=n1+1, referring again to FIG. 23, the time interval between the valid level output by the n2-th second shift sub-register 16_n2 and that output by the n1-th second shift sub-register 16_n1 is t3, where t3<F/X. F is the duration of one frame, X is the number of circuit rows 11, and F/X is commonly referred to as a row time H.

When the fifth scan line S5 outputs a valid level later than the third scan line S3, by having a smaller time interval between the valid levels output sequentially by the second shift register 15, the overall duration required for the first scan line S1, second scan line S2, third scan line S3 and fifth scan line S5 to output valid levels within a frame can be reduced, reducing the non-glowing time.

Figure 24:
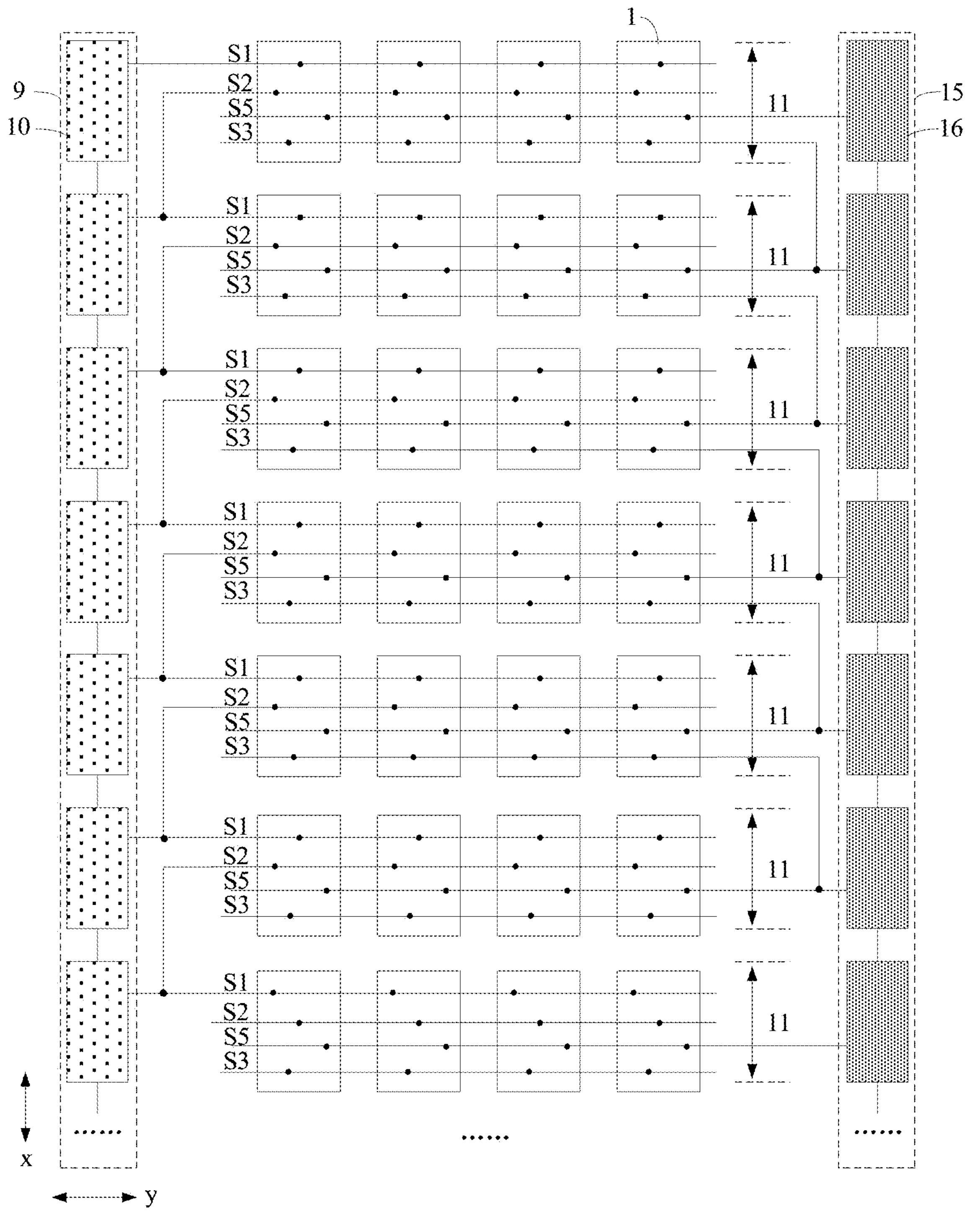
FIG. 24 is a schematic diagram of a connection between a scan line and a shift register according to some embodiments of the present disclosure.
Figure 25:
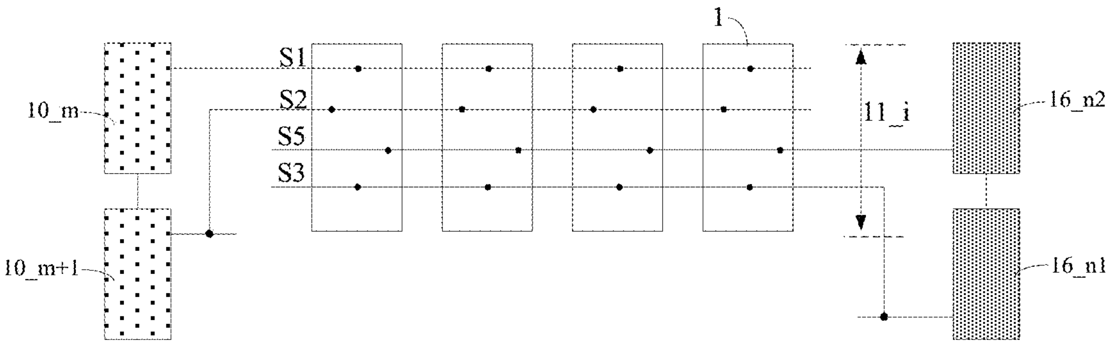
FIG. 25 is a schematic diagram of a connection between a scan line and a shift register corresponding to the i-th circuit row in FIG. 24.
Figure 26:
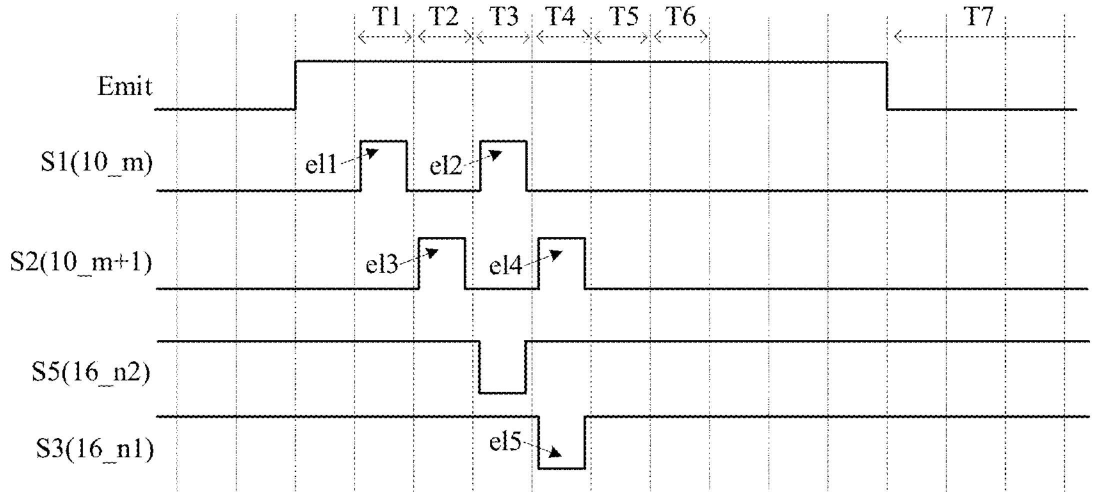
FIG. 26 is a timing diagram corresponding to FIG. 25 according to some embodiments of the present disclosure.

FIG. 24 is a connection diagram of scan lines and shift registers according to some embodiments of the present disclosure, FIG. 25 is a connection diagram of shift registers and scan lines corresponding to the i-th circuit row in FIG. 24, and FIG. 26 is a timing diagram corresponding to FIG. 25. As shown in FIG. 24 to FIG. 26, where n1 is an integer greater than or equal to 2, and n2=n1−1. In some embodiments of the present disclosure, n2=i, and n1=i+1. In this structure, the bias state of the driving transistor M0 is adjusted by the bias drive module 2 prior to charging.

Figure 27:
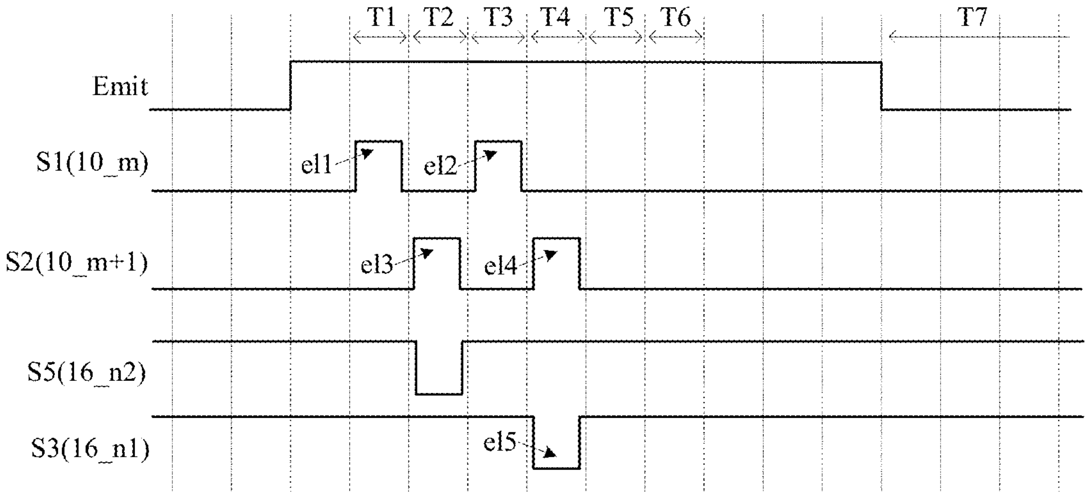
FIG. 27 is a timing diagram corresponding to FIG. 25 according to some embodiments of the present disclosure.

FIG. 27 is a timing diagram corresponding to FIG. 25. Furthermore, as shown in FIG. 27, for the i-th circuit row 11_i, the valid level output by its corresponding n2-th second shift sub-register 16_n2 overlaps the third valid level el3 output by its corresponding (m+1)-th first shift sub-register 10_m+1.

Typically, the bias voltage is much greater than the reset voltage. In some embodiments of the present disclosure, the bias adjustment module 17 is turned on during the second period T2 during which both the threshold compensation module 4 and the bias adjustment module 17 are turned on. Since the bias voltage is continuously written into the second node N2, the bias voltage of the second node N2 is further written into the third node N3 and the first node N1, allowing for a three-terminal reset of the driving module 2 using only the bias voltage, which avoids excessive potential differences across the two terminals of the driving module 2.

Figure 28:
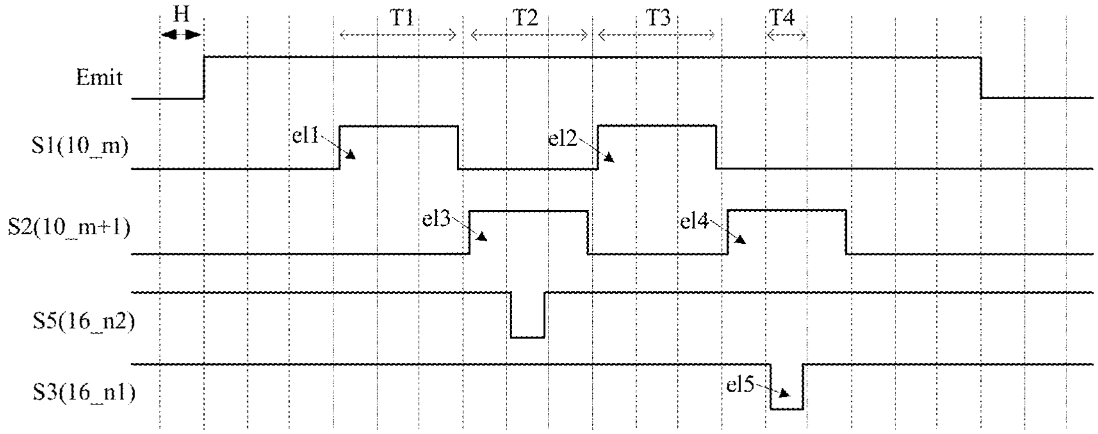
FIG. 28 is a timing diagram corresponding to a shift register according to some embodiments of the present disclosure.

In some embodiments of the present disclosure, as shown in FIG. 28, which is a timing diagram corresponding to the shift registers according to some embodiments of the present disclosure, the pulse width of the valid level output by the first shift sub-register 10 is greater than that of the valid level output by the second shift sub-register 16.

Currently, shift registers that output high valid levels and those that output low valid levels are of different types. Typically, the pulse width of the valid level output by shift registers that output high valid levels is larger. Therefore, in some embodiments of the present disclosure, differentiated design of the pulse widths of the valid levels output by the first shift register 9 and the second shift register 15 enables the first shift sub-register 10 to output the higher valid level with the larger pulse width. From another perspective, the larger the pulse width of the valid level output by the first shift sub-register 10, the longer the three-terminal reset time of the driving module 2, resulting in better reset effects.

Figure 29:
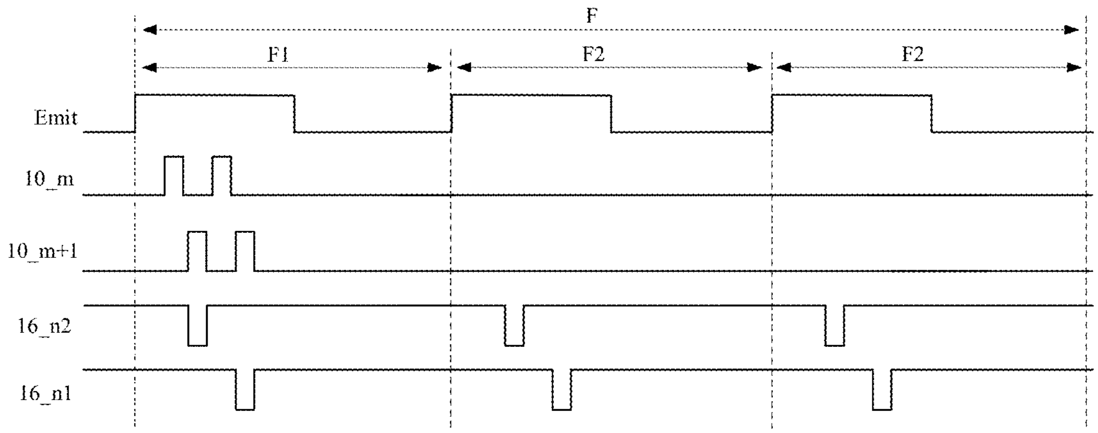
FIG. 29 is a timing diagram corresponding to a shift register according to some embodiments of the present disclosure.

FIG. 29 is a timing diagram corresponding to the shift registers according to some embodiments of the present disclosure. In some embodiments of the present disclosure, as shown in FIG. 29, the display panel has a first mode, where one frame F in the first mode includes a writing frame F1 and a holding frame F2. In at least one holding frame F2, the second shift sub-register 16 outputs a valid level.

The first mode can be a low-frequency mode. Since the frame in the low-frequency mode is longer, the shift of the driving transistor M0 is more pronounced. Therefore, by enabling the second shift sub-register 16 to output a valid level in at least one holding frame F2, the bias state of the driving transistor M0 can be adjusted during the holding frame F2, improving device performance.

Figure 30:
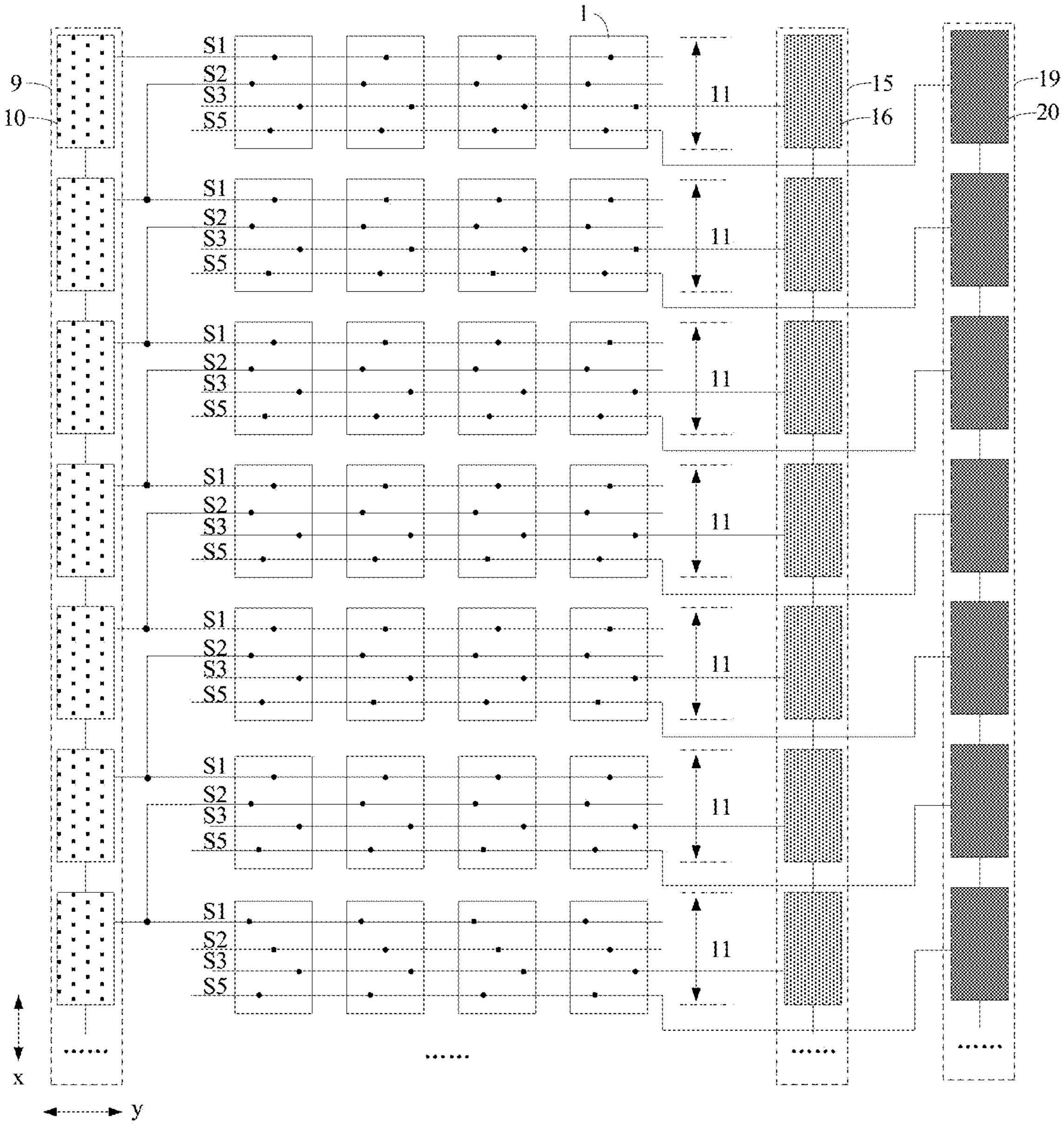
FIG. 30 is a schematic diagram of a connection between a scan line and a shift register according to some embodiments of the present disclosure.
Figure 31:
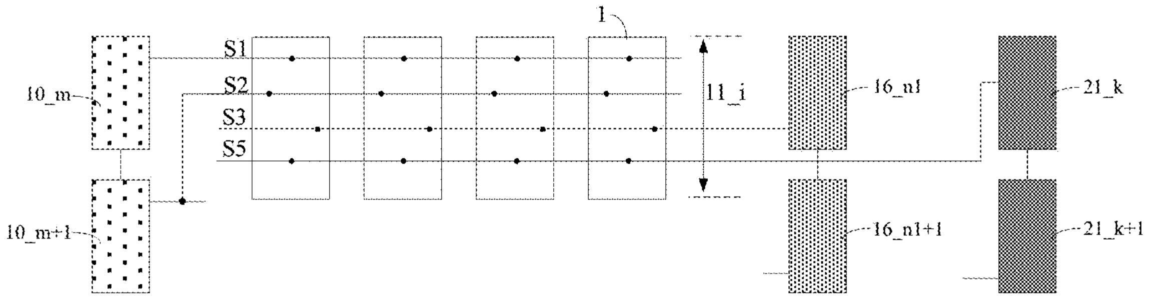
FIG. 31 is a schematic diagram of a connection between a scan line and a shift register corresponding to the i-th circuit row in FIG. 30 according to some embodiments of the present disclosure.
Figure 32:
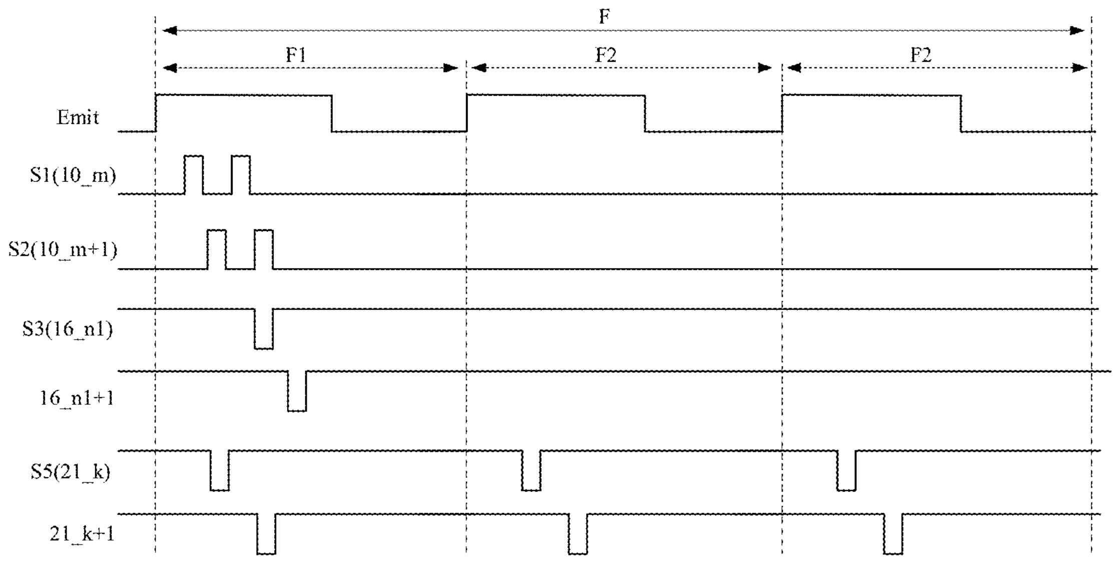
FIG. 32 is a timing diagram corresponding to FIG. 31 according to some embodiments of the present disclosure.

FIG. 30 is a connection diagram of scan lines and shift registers provided by embodiment of the present disclosure, FIG. 31 is a connection diagram of shift registers and scan lines corresponding to the i-th circuit row in FIG. 30, and FIG. 32 is a timing diagram corresponding to FIG. 31. In some embodiments of the present disclosure, combining with FIG. 15, as shown in FIG. 30 to FIG. 32, the display panel further includes a bias adjustment module 17. A control terminal of the bias adjustment module 17 is electrically connected to the fifth scan line S5, a first terminal of the bias adjustment module 17 is electrically connected to a bias signal line DVH, and a second terminal of the bias adjustment module 17 is electrically connected to the second node N2.

The display panel further includes a third shift register 19 which includes multiple third shift sub-registers 20 in cascade. Within one frame, the third shift sub-register 20 output at least one valid level.

The fifth scan line S5 is electrically connected to the third shift sub-register 20, and the valid levels output by the second shift sub-register 16 and the third shift sub-register 20 connected to the same pixel circuit 1 do not overlap.

In some embodiments of the present disclosure, referring to FIG. 31, for the i-th circuit row 11_*i*, its corresponding fifth scan line S5 is electrically connected to the k-th third shift sub-register 20 within the third shift register 19. In some embodiments of the present disclosure, k=i.

In this structure, the data write module 5 and the bias adjustment module 17 in the pixel circuit 1 are driven by two different shift registers, allowing separate control over the activation times and frequencies of the data write module 5 and the bias adjustment module 17. For example, as shown in FIG. 32, during the holding frame F2, only the third shift register 19 can be made to output a valid level, while the second shift sub-register 16 does not output a valid level.

In some embodiments of the present disclosure, combining with FIG. 7, the pixel circuit 1 further includes an anode reset module 12. A control terminal of the anode reset module 12 is electrically connected to the fourth scan line S4, a first terminal of the anode reset module 12 is electrically connected to the second reset line Ref2, and a second terminal of the anode reset module 12 is electrically connected to the light-emitting element 14.

Figure 33:
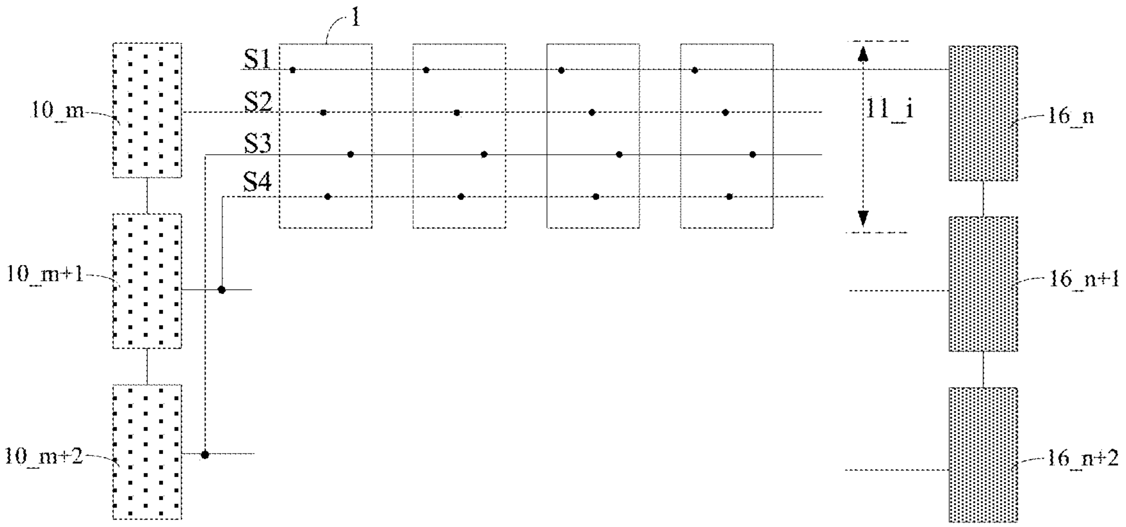
FIG. 33 is a schematic diagram of a connection between a scan line and a shift register corresponding to the i-th circuit row according to some embodiments of the present disclosure.

FIG. 33 is a connection diagram of shift registers and scan lines corresponding to the i-th circuit row according to some embodiments of the present disclosure. As shown in FIG. 33, the fourth scan line S4 is electrically connected to the first shift sub-register 10. For example, for the i-th circuit row 11_*i*, when its corresponding first scan line S1 is electrically connected to the n-th second shift sub-register 16_*n* in the second shift register 15, and its corresponding second scan line S2 and third scan line S3 are electrically connected to the m-th first shift sub-register 10_*m* and the (m+2)-th first shift sub-register 10_*m*+1, respectively, in the first shift register 9, its corresponding fourth scan line S4 is electrically connected to the (m+1)-th first shift sub-register 10_*m*+1 in the first shift register 9.

When the (m+1)-th first shift sub-register 10 outputs a valid level, the anode reset module 12 is turned on, using the second reset voltage to reset the anode of the light-emitting element 14.

Figure 34:
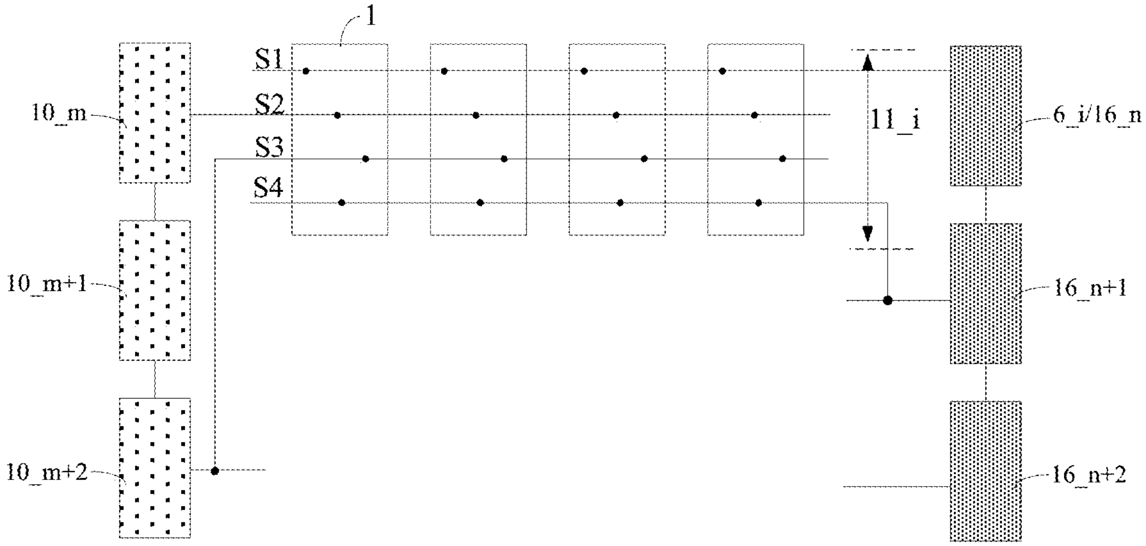
FIG. 34 is a schematic diagram of a connection between a scan line and a shift register corresponding to the i-th circuit row according to some embodiments of the present disclosure.

FIG. 34 is a connection diagram of shift registers and scan lines corresponding to the i-th circuit row according to some embodiments of the present disclosure. As shown in FIG. 34, the fourth scan line S4 can be electrically connected to the second shift sub-register 16. For example, for the i-th circuit row 11_*i*, when its corresponding first scan line S1 is electrically connected to the n-th second shift sub-register 16_*n* in the second shift register 15, and its corresponding second scan line S2 and third scan line S3 are electrically connected to the m-th first shift sub-register 10_*m* and the (m+2)-th first shift sub-register 10_*m*+2, respectively, in the first shift register 9, its corresponding fourth scan line S4 can be electrically connected to the (n+1)-th second shift sub-register 16_*n*+1 in the second shift register 15.

When the (n+1)-th second shift sub-register 16_*n*+1 outputs a valid level, the anode reset module 12 is turned on, the anode of the light-emitting element 14 is reset using the second reset voltage.

In the above structure, the fourth scan line S4 can share a shift register with other scan lines, so that an additional shift register is not required to dispose for the fourth scan line S4, thereby simplifying the structural design.

Figure 35:
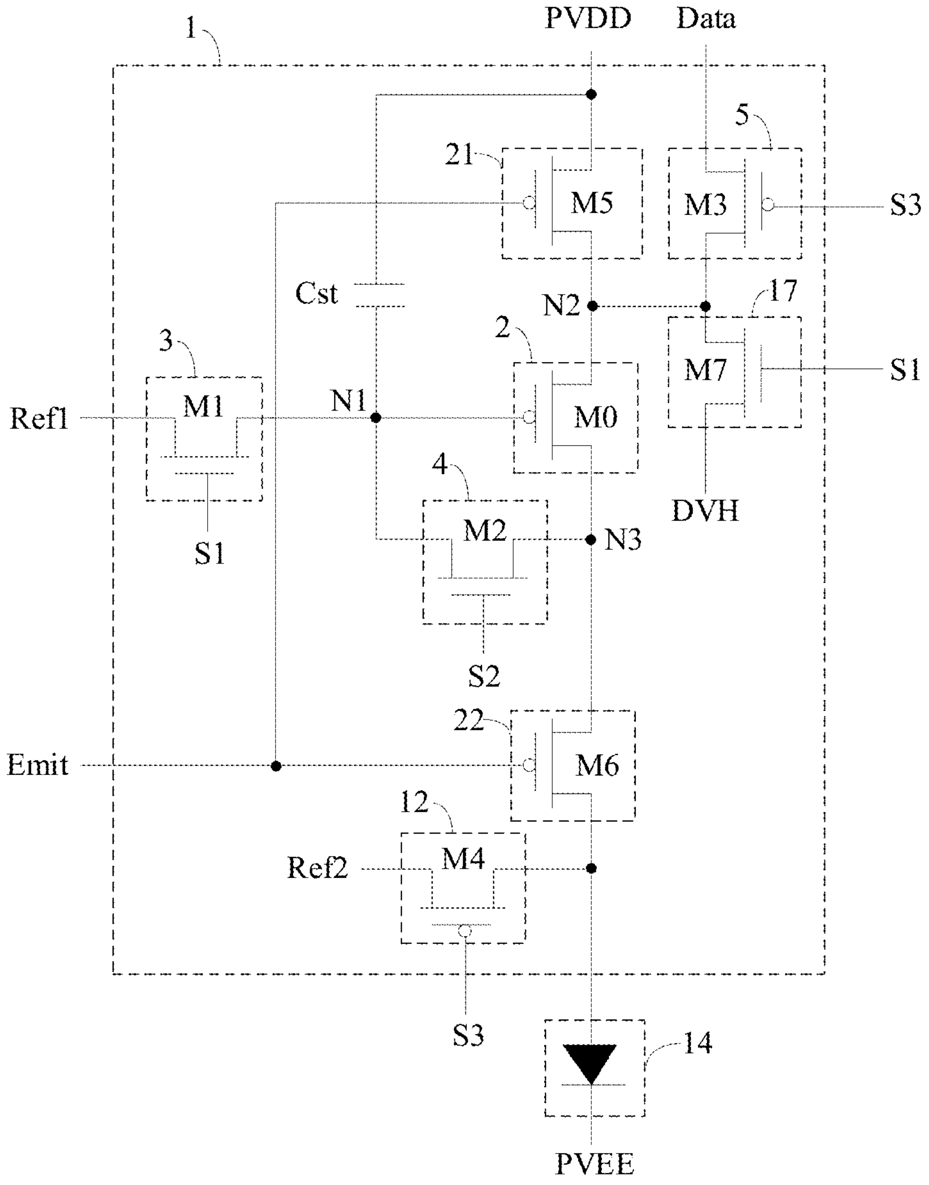
FIG. 35 is a structural schematic diagram of a pixel circuit according to some embodiments of the present disclosure.
Figure 36:
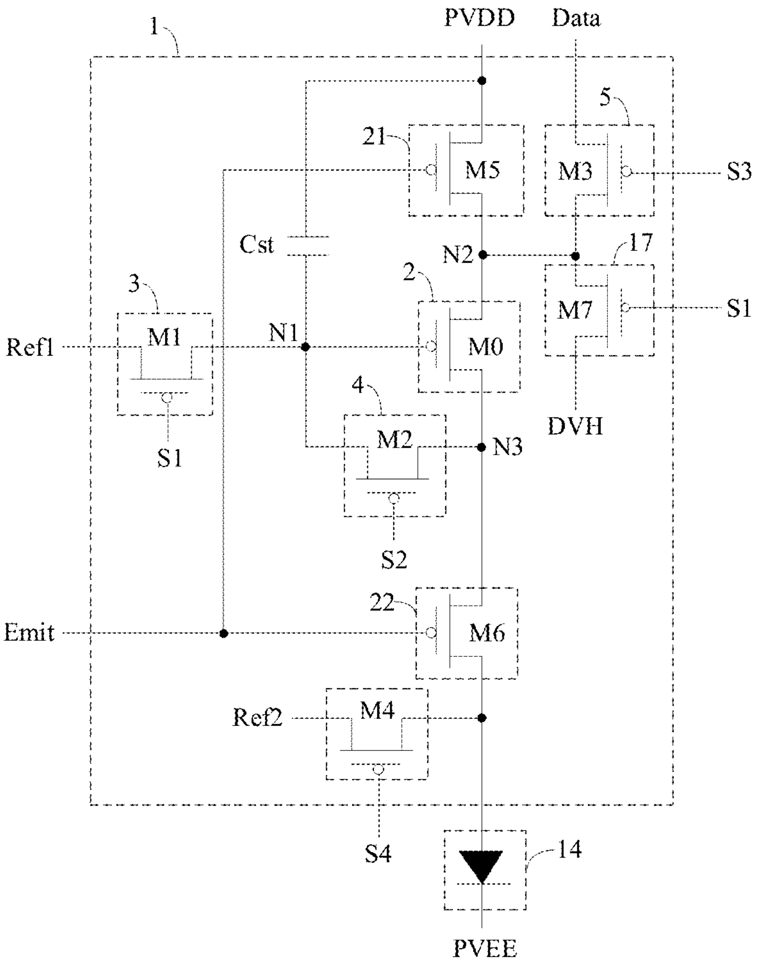
FIG. 36 is a structural schematic diagram of a pixel circuit according to some embodiments of the present disclosure.

FIG. 35 is a structural schematic diagram of the pixel circuit 1 according to some embodiments of the present disclosure, and FIG. 36 is a structural schematic diagram of the pixel circuit 1 according to some embodiments of the present disclosure. In some embodiments of the present disclosure, as shown in FIGS. 35 and 36, the display panel further includes a bias adjustment module 17. A control terminal of the bias adjustment module 17 is electrically connected to the first scan line S1, a first terminal of the bias adjustment module 17 is electrically connected to the bias signal line DVH, and a second terminal of the bias adjustment module 17 is electrically connected to the second node N2.

With such configuration, the bias adjustment module 17 and the gate reset module 3 share the scan line. During the first period T1 and the third period T3, the bias adjustment module 17 is turned on, the bias voltage is written into the second node N2.

It should be noted that during the first period T1, after the bias voltage is written into the second node N2, since the driving module 2 is turned on, the bias voltage of the second node N2 will further be written into the third node N3 through the driving module 2. During the second period T2, although the threshold compensation module 4 is turned on, since there is no continuous external signal being written into the first node N1 and the third node N3 during this period, the first node N1 maintains the first reset voltage written during the first period T1, and the second node N2 and the third node N3 maintain the bias voltage written during the first period T1, a three-terminal reset of the driving module 2 is performed using the first reset voltage and the bias voltage.

In some embodiments of the present disclosure, referring again to FIG. 2, the pixel circuit 1 further includes an anode reset module 12. A control terminal of the anode reset module 12 is electrically connected to one of the first scan line S1, the second scan line S2 and the third scan line S3, a first terminal of the anode reset module 12 is electrically connected to the second reset line Ref2, and a second terminal of the anode reset module 12 is electrically connected to the light-emitting element 14, so that additional scan lines and shift registers are not required to dispose for the anode reset module 12.

A circuit structure of pixel circuit 1 is described below in detail.

The pixel circuit 1 includes a driving module 2, a gate reset module 3, a threshold compensation module 4, a data write module 5, an anode reset module 12, a first light-emitting control module 21, a second light-emitting control module 22, a bias adjustment module 17, and a storage capacitor Cst.

The driving module 2 includes a driving transistor M0. A gate of the driving transistor M0 is electrically connected to the first node N1, a first terminal of the driving transistor M0 is electrically connected to the second node N2, and a second terminal of the driving transistor M0 is electrically connected to the third node N3.

The gate reset module 3 includes a gate reset transistor M1. A gate of the gate reset transistor M1 is electrically connected to the first scan line S1, a first terminal of the gate reset transistor M1 is electrically connected to the first reset line Ref1, and a second terminal of the gate reset transistor M1 is electrically connected to the first node N1.

The threshold compensation module 4 includes a threshold compensation transistor M2. A gate of the threshold compensation transistor M2 is electrically connected to the second scan line S2, a first terminal of the threshold compensation transistor M2 is electrically connected to the third node N3, and a second terminal of the threshold compensation transistor M2 is electrically connected to the first node N1.

The data write module 5 includes a data write transistor M3. A gate of the data write transistor M3 is electrically connected to the third scan line S3, a first terminal of the data write transistor M3 is electrically connected to the data line Data, and a second terminal of the data write transistor M3 is electrically connected to the second node N2.

The anode reset module 12 includes an anode reset transistor M4. A gate of the anode reset transistor M4 is electrically connected to one of the first scan line S1, the second scan line S2, the third scan line S3 and the fourth scan line S4, a first terminal of the anode reset transistor M4 is electrically connected to the second reset line Ref2, and a second terminal of the anode reset transistor M4 is electrically connected to the light-emitting element 14.

The first light-emitting control module 21 includes a first light-emitting control transistor M5. A gate of the first light-emitting control transistor M5 is electrically connected to the light-emitting control signal line Emit, the first terminal of the first light-emitting control transistor M5 is electrically connected to the first power supply line PVDD, and the second terminal of the first light-emitting control transistor M5 is electrically connected to the second node N2.

The second light-emitting control module 22 includes a second light-emitting control transistor M6. A gate of the second light-emitting control transistor M6 is electrically connected to the light-emitting control signal line Emit, the first terminal of the second light-emitting control transistor M6 is electrically connected to the third node N3, and the second terminal of the second light-emitting control transistor M6 is electrically connected to the light-emitting element 14.

The bias adjustment module 17 includes a bias adjustment transistor M7. The gate of the bias adjustment transistor M7 is electrically connected to the fifth scan line S5 or the first scan line S1, the first terminal of the bias adjustment transistor M7 is electrically connected to the bias signal line DVH, and the second terminal of the bias adjustment transistor M7 is electrically connected to the second node N2.

A first plate of the storage capacitor Cst is electrically connected to the first power supply line PVDD, and a second plate of the storage capacitor Cst is electrically connected to the first node N1.

A driving cycle of pixel circuit 1 further includes a seventh period T7, during which the light-emitting control signal line Emit provides a valid level, the first light-emitting control module 21 and the second light-emitting control module 22 are turned on, and the driving current converted by the driving module 2 flows into the light-emitting element 14, driving it to emit light.

Based on a same inventive concept, the embodiments of the present disclosure further provide a method for driving a display panel, which is applied to the above-mentioned display panel.

As shown in FIG. 1 to FIG. 3, the display panel includes pixel circuits 1. The pixel circuit includes a driving module 2, a gate reset module 3, a threshold compensation module 4 and a data write module 5.

The control terminal of the driving module 2 is electrically connected to the first node N1, the first terminal of the driving module 2 is electrically connected to the second node N2, and the second terminal of the driving module 2 is electrically connected to the third node N3. The control terminal of the gate reset module 3 is electrically connected to the first scan line S1, the first terminal of the gate reset module 3 is electrically connected to the first reset line Ref1, and the second terminal of the gate reset module 3 is electrically connected to the first node N1. The control terminal of the threshold compensation module 4 is electrically connected to the second scan line S2, the first terminal of the threshold compensation module 4 is electrically connected to the third node N3, and the second terminal of the threshold compensation module 4 is electrically connected to the first node N1. The control terminal of the data write module 5 is electrically connected to the third scan line S3, the first terminal of the data write module 5 is electrically connected to the data line Data, and the second terminal of the data write module 5 is electrically connected to the second node N2.

For the first scan line S1, second scan line S2, and third scan line S3 that are electrically connected to the same pixel circuit 1, within one frame, the first scan line S1 outputs a first valid level el1 and a second valid level el2, the second scan line S2 outputs a third valid level el3 and a fourth valid level el4, and the third scan line S3 outputs a fifth valid level el5. Additionally, at least a part of the third valid level el3 is located between the first valid level el1 and the second valid level el2, at least a part of the second valid level el2 is located between the third valid level el3 and the fourth valid level el4, and the fifth valid level el5 overlaps the fourth valid level el4.

The driving cycle of the pixel circuit 1 includes a first period T1, a second period T2, a third period T3 and a fourth period T4.

The driving method includes following steps.

In the first period T1, turning on the gate reset module 3 in response to the first valid level el1, and writing a first reset voltage provided by the first reset line Ref1 into the first node N1.

In the second period T2, turning on the threshold compensation module 4 in response to the third valid level el3.

In the third period T3, turning on the gate reset module 3 in response to the second valid level el2 again, and writing the first reset voltage provided by the first reset line Ref1 into the first node N1 once more.

In the fourth period T4, turning on the data write module 5 in response to the fifth valid level el5, turning on the threshold compensation module 4 in response to the fourth valid level el4 simultaneously, and writing the data voltage on the data line Data into the first node N1 for threshold compensation.

Based on the aforementioned analysis, by adopting this driving method, prior to charging, the driving module 2 in the pixel circuit 1 undergoes a three-terminal reset operation in advance. This ensures that the device performances of the driving module 2 in different pixel circuits 1 are reset to the same initial state, effectively addressing the issue of inconsistent device performances of the driving module 2 caused by different sub-pixels displaying different grayscale in the previous frame.

In some embodiments of the present disclosure, as shown in FIG. 4 to FIG. 6, during the second period T2, the threshold compensation module 4 is turned on in response to the third valid level el3, and the first reset voltage on the first node N1 is written into the third node N3 through the threshold compensation module 4 and then into the second node N2 through the driving module 2, thereby performing a three-terminal reset of the driving module 2 solely using the first reset voltage.

In some embodiments of the present disclosure, as shown in FIG. 35 and FIG. 3, the display panel further includes a bias adjustment module 17. The control terminal of the bias adjustment module 17 is electrically connected to the first scan line S1, the first terminal of the bias adjustment module 17 is electrically connected to a bias signal line DVH, and the second terminal of the bias adjustment module 17 is electrically connected to the second node N2.

During the first period T1, both the gate reset module 3 and the bias adjustment module 17 respond to the first valid level el1 to be turned on, and the bias voltage on the bias signal line DVH is written into the second node N2 and then into the third node N3 through the driving module 2. During the second period T2, the threshold compensation module 4 is turned on in response to the third valid level el3, while the first node N1 maintains the first reset voltage and the third node N3 maintains the bias voltage, thereby performing a three-terminal reset of the driving module 2 using both the first reset voltage and the bias voltage.

Furthermore, in some embodiments of the present disclosure, as shown in FIG. 2, FIG. 4 to FIG. 6, within one frame, the third scan line S3 further outputs a sixth valid level el6.

The driving cycle of the pixel circuit 1 further includes a fifth period T5 and a sixth period T6. For the pixel circuit 1 in the i-th circuit row 11, the driving method further includes: during the sixth period T6, turning on the data write module 5 in response to the sixth valid level el6 and writing the voltage on the data line Data into the second node N2, thereby refreshing the potential of the second node N2 again subsequent to charging, the bias state of the driving transistor M0 is adjusted, preventing the performances of the driving transistor M0 from drifting, which improves the hysteresis effect of the driving transistor M0, ultimately contributing to optimizing the display effect, such as improving the residual image.

In some embodiments of the present disclosure, referring again to FIG. 20 to FIG. 23, the display panel further includes multiple circuit rows 11 arranged along a first direction x. Each circuit row 11 includes multiple pixel circuits 1 arranged along a second direction y. The first direction x intersects with the second direction y.

The display panel further includes a first shift register 9 and a second shift register 15. The first shift register 9 includes multiple first shift sub-registers 10 arranged in cascade, and the second shift register 15 includes multiple second shift sub-registers 16 arranged in cascade. During one frame, each first shift sub-register 10 outputs at least two valid levels, while each second shift sub-register 16 outputs at least one valid level. In addition, the potential of the valid level output by the first shift sub-registers 10 is opposite to that of the valid level output by the second shift sub-registers 16.

For the i-th circuit row 11_*i*, its corresponding first scan line S1 and second scan line S2 are respectively connected to the m-th first shift sub-register 10_*m* and the (m+1)-th first shift sub-register 10_*m*+1 in the first shift register 9, while its corresponding third scan line S3 is connected to the n1-th second shift sub-register 16_*n*1 in the second shift register 15. Where i, m and n1 are integers greater than or equal to 1.

The display panel further includes a bias adjustment module 17. A control terminal of the bias adjustment module 17 is electrically connected to a fifth scan line S5, a first terminal of the bias adjustment module 17 is electrically connected to a bias signal line DVH, and a second terminal of the bias adjustment module 17 is electrically connected to the second node N2.

For the i-th circuit row 11_*i*, its corresponding fifth scan line S5 is electrically connected to the n2-th second shift sub-register 16 in the second shift register 15, where n2 is an integer greater than or equal to 1, and n2+n1.

For the i-th circuit row 11_*i*, either prior to or subsequent to the fourth period T4, the driving method further includes: turning on the bias adjustment module 17 in response to the valid level output by the n2-th second shift sub-register 16, and writing the bias voltage on the bias signal line DVH into the second node N2. This refreshes the potential of the second node N2, adjusts the bias state of the driving transistor M0, which prevents the performances of the driving transistor M0 from drifting, and improves the hysteresis effect of the driving transistor M0, ultimately contributing to optimizing the display effect, such as improving the residual image.

Furthermore, referring to FIG. 24, FIG. 25 and FIGS. 27, n2=n1−1, where n1 is an integer greater than or equal to 2. Additionally, for the pixel circuit 1 in the i-th circuit row, the valid level output by its corresponding n2-th second shift sub-register 16 overlaps the third valid level output by its corresponding (m+1)-th first shift sub-register 10.

For the i-th circuit row 11_*i*, during the second period T2, after the voltage on the bias signal line DVH is written into the second node N2, then written into the third node N3 through the conductive driving module 2, and further into the first node N1 through the conductive threshold compensation module 4.

Typically, the bias voltage is much greater than the reset voltage. In some embodiments of the present disclosure, the bias adjustment module 17 is turned on during the second period T2. During this period, both the threshold compensation module 4 and the bias adjustment module 17 are turned on. Since the bias voltage is continuously written into the second node N2, it is further written into the third node N3 and the first node N1, allowing for a three-terminal reset of the driving module 2 solely using the bias voltage, thereby avoiding excessive potential differences across the two terminals of the driving module 2.

Figure 37:
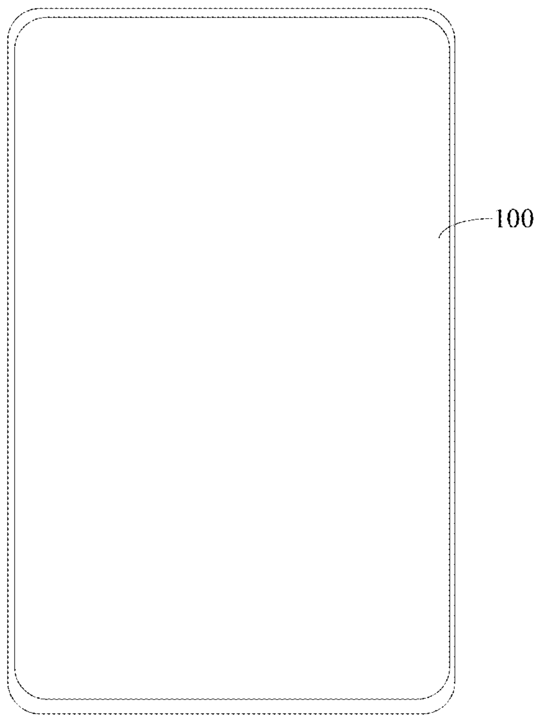
FIG. 37 is a structural schematic diagram of a display apparatus according to some embodiments of the present disclosure.

Based on a same inventive concept, embodiments of the present disclosure further provide a display apparatus, as shown in FIG. 37, which is a structural diagram of a display apparatus provided by the embodiments of the present disclosure. The display apparatus includes the aforementioned display panel 100. The specific structure of the display panel 100 has been described in detail in the above embodiments and will not be repeated here. The display apparatus shown in FIG. 37 is merely illustrative, and the display apparatus can be any electronic device with display functionality, such as a mobile phone, a tablet computer, a laptop computer, an e-reader, or a television.

The above are merely exemplary embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A display panel, comprising pixel circuits, wherein one of the pixel circuits comprises:

a driving module comprising a control terminal electrically connected to a first node, a first terminal electrically connected to a second node, and a second terminal electrically connected to a third node;

a gate reset module comprising a control terminal electrically connected to a first scan line, a first terminal electrically connected to a first reset line, and a second terminal electrically connected to the first node;

a threshold compensation module comprising a control terminal electrically connected to a second scan line, a first terminal electrically connected to the third node, and a second terminal electrically connected to the first node;

a data writing module comprising a control terminal electrically connected to a third scan line, a first terminal electrically connected to a data line, and a second terminal electrically connected to the second node;

a first shift register comprising first shift sub-registers arranged in cascade, wherein within one frame, the first shift sub-register outputs at least two valid levels; for the same pixel circuit, at least two of the first scan line, the second scan line and third scan line corresponding to the same pixel circuit are electrically connected to the first shift sub-registers; and a second shift register comprising second shift sub-registers arranged in cascade, wherein the first scan line is electrically connected to the second shift sub-register, and the second scan line and the third scan line are respectively electrically connected to the first shift sub-registers; or the first scan line and the second scan line are respectively electrically connected to the first shift sub-registers, and the third scan line is electrically connected to the second shift sub-register;

wherein for the first scan line, the second scan line and the third scan line that are electrically connected to a same pixel circuit, within one frame, the first scan line outputs a first valid level and a second valid level, the second scan line outputs a third valid level and a fourth valid level, the third scan line outputs a fifth valid level, and at least a part of the third valid level is located between the first valid level and the second valid level, at least a part of the second valid level is located between the third valid level and the fourth valid level, and the fifth valid level overlaps the fourth valid level.

2. The display panel according to claim 1, further comprising circuit rows arranged along a first direction, wherein one of the circuit rows comprises the pixel circuits arranged along a second direction, the second direction intersects with the first direction;

wherein the first scan line, second scan line and third scan line corresponding to an i-th circuit row are respectively electrically connected to m-th, (m+1)-th and (m+3)-th first shift sub-registers in the first shift register, i is an integer greater than or equal to 1, and m is an integer greater than or equal to 1.

3. The display panel according to claim 2, further comprising an anode reset module comprising a control terminal electrically connected to a fourth scan line, a first terminal electrically connected to a second reset line, and a second terminal electrically connected to a light-emitting element; and wherein the fourth scan line corresponding to the i-th circuit row is electrically connected to a (m+2)-th first shift sub-register in the first shift register.

4. The display panel according to claim 1, wherein within one frame, the second shift sub-register outputs at least two valid levels;

the display panel further comprises circuit rows arranged along a first direction, one of the circuit rows comprises pixel circuits arranged along a second direction which intersects with the first direction;

wherein the first scan line corresponding to an i-th circuit row is electrically connected to a n-th second shift sub-register in the second shift register, and the second scan line and the third scan line corresponding to the i-th circuit row are respectively electrically connected to a m-th and (m+2)-th first shift sub-registers in the first shift register; i is an integer greater than or equal to 1, m is an integer greater than or equal to 1, and n is an integer greater than or equal to 1; and a time interval between the time point when the n-th second shift sub-register stops outputting the first valid level and the time point when the m-th first shift sub-register starts outputting the third valid level is t1, and a time interval between the time point when the m-th first shift sub-register stops outputting the third valid level and the time point when the n-th second shift sub-register starts outputting the second valid level is t2, where $t1 \neq t2$; the second valid level output by the n-th second shift sub-register does not overlap the fifth valid level output by the (m+2)-th first shift sub-register.

5. The display panel according to claim 4, wherein $t1 < t2$.

6. The display panel according to claim 1, wherein within one frame, the second shift sub-register outputs at least one valid level, and a potential of the valid level output by the second shift sub-register is opposite to that of the valid level output by the first shift sub-register;

the display panel further comprises circuit rows arranged along a first direction, and one of the circuit rows comprises multiple pixel circuits arranged along a second direction which intersects with the first direction;

the first scan line and the second scan line corresponding to an i-th circuit row are electrically connected to a m-th and (m+1)-th first shift sub-registers, respectively, in the first shift register, and the third scan line corresponding to the i-th circuit row is electrically connected to the a n1-th second shift sub-register in the second shift register, wherein i is an integer greater than or equal to 1, m is an integer greater than or equal to 1, and n1 is an integer greater than or equal to 1.

7. The display panel according to claim 6, further comprising a bias adjustment module comprising a control terminal electrically connected to a fifth scan line, a first terminal electrically connected to a bias signal line, and a second terminal electrically connected to the second node, wherein the fifth scan line corresponding to the i-th circuit row is electrically connected to the n2-th second shift sub-register in the second shift register, wherein n2 is an integer greater than or equal to 1, and n2/n1.

8. The display panel according to claim 7, wherein $n2=n1+1$.

9. The display panel according to claim 8, wherein a time interval between the valid level output by the n2-th second shift sub-register and the valid level output by the n1-th second shift sub-register is t3, wherein $t3<F/X$, F is a duration of one frame, and X is a number of circuit rows.

10. The display panel according to claim 7, wherein $n2=n1-1$, n1 is an integer greater than or equal to 2.

11. The display panel according to claim 10, wherein the valid level output by the n2-th second shift sub-register overlaps the third valid level output by the (m+1)-th first shift sub-register.

12. The display panel according to claim 6, wherein a pulse width of the valid level output by the first shift sub-register is greater than that of the valid level output by the second shift sub-register.

13. The display panel according to claim 6, wherein the display panel has a first mode, one frame in the first mode comprises a writing frame and a holding frame, and during at least one holding frame, the second shift sub-register outputs a valid level.

14. The display panel according to claim 2, wherein the display panel further comprises a bias adjustment module, a control terminal of the bias adjustment module is electrically connected to a fifth scan line, a first terminal of the bias adjustment module is electrically connected to a bias signal line, and a second terminal is electrically connected to the second node;

the display panel further comprises a third shift register comprising multiple third shift sub-registers in cascade, within one frame, the third shift sub-register output at least one valid level; and the fifth scan line is electrically connected to the third shift sub-register, and the valid levels output by the second shift sub-register and the third shift sub-register connected to the same pixel circuit do not overlap.

15. The display panel according to claim 1, further comprising an anode reset module comprising a control terminal electrically connected to a fourth scan line, a first terminal electrically connected to a second reset line, and a second terminal electrically connected to a light-emitting element;

wherein the fourth scan line is electrically connected to the first shift sub-register, or the fourth scan line is electrically connected to the second shift sub-register.

16. The display panel according to claim 1, further comprising a bias adjustment module comprising a control terminal electrically connected to the first scan line, a first terminal electrically connected to a bias signal line, and a second terminal electrically connected to the second node.

17. The display panel according to claim 1, further comprising an anode reset module comprising a control terminal electrically connected to one of the first scan line, the second scan line and the third scan line; a first terminal electrically connected to a second reset line; and a second terminal electrically connected to a light-emitting element.

18. A display apparatus, comprising a display panel, wherein the display panel comprises pixel circuits, and one of the pixel circuits comprises:

a driving module comprising a control terminal electrically connected to a first node, a first terminal electrically connected to a second node, and a second terminal electrically connected to a third node;

a gate reset module comprising a control terminal electrically connected to a first scan line, a first terminal electrically connected to a first reset line, and a second terminal electrically connected to the first node;

a threshold compensation module comprising a control terminal electrically connected to a second scan line, a first terminal electrically connected to the third node, and a second terminal electrically connected to the first node;

a data writing module comprising a control terminal electrically connected to a third scan line, a first terminal electrically connected to a data line, and a second terminal electrically connected to the second node;

a first shift register comprising first shift sub-registers arranged in cascade, wherein within one frame, the first shift sub-register outputs at least two valid levels; for the same pixel circuit, at least two of the first scan line, the second scan line and third scan line corresponding to the same pixel circuit are electrically connected to the first shift sub-registers; and a second shift register comprising second shift sub-registers arranged in cascade, wherein the first scan line is electrically connected to the second shift sub-register, and the second scan line and the third scan line are respectively electrically connected to the first shift sub-registers; or the first scan line and the second scan line are respectively electrically connected to the first shift sub-registers, and the third scan line is electrically connected to the second shift sub-register;

wherein for the first scan line, the second scan line and the third scan line that are electrically connected to a same pixel circuit, within one frame, the first scan line outputs a first valid level and a second valid level, the second scan line outputs a third valid level and a fourth valid level, the third scan line outputs a fifth valid level, and at least a part of the third valid level is located between the first valid level and the second valid level, at least a part of the second valid level is located between the third valid level and the fourth valid level, and the fifth valid level overlaps the fourth valid level.

* * * * *